US010317941B2

(12) United States Patent
Janowski et al.

(10) Patent No.: US 10,317,941 B2
(45) Date of Patent: *Jun. 11, 2019

(54) HUMAN BODY MOUNTED ELECTRONIC DEVICE SUPPORT SYSTEMS WITH ADJUSTABLE MONITOR VIEWING APPARATUS

(71) Applicants: Brian Patrick Janowski, Marquette, MI (US); Matthew Brian Janowski, Marquette, MI (US)

(72) Inventors: Brian Patrick Janowski, Marquette, MI (US); Matthew Brian Janowski, Marquette, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/607,679

(22) Filed: May 29, 2017

(65) Prior Publication Data
US 2017/0262016 A1 Sep. 14, 2017

Related U.S. Application Data

(63) Continuation-in-part of application No. 14/691,500, filed on Apr. 20, 2015, now Pat. No. 9,661,918.
(Continued)

(51) Int. Cl.
*G06F 1/16* (2006.01)
*G06F 3/02* (2006.01)
(Continued)

(52) U.S. Cl.
CPC ............ *G06F 1/163* (2013.01); *A45F 3/14* (2013.01); *A47B 23/002* (2013.01); *F16M 13/04* (2013.01);
(Continued)

(58) Field of Classification Search
CPC ..... A47B 23/002; A47B 23/041; A45F 5/021; A45F 5/00; A45F 2003/144; A47G 23/0608; A47G 23/06; G06F 1/16
(Continued)

(56) References Cited

U.S. PATENT DOCUMENTS 2,861,854 A 11/1958 Best
3,125,825 A * 3/1964 Gaudette .............. A47B 23/002
108/43
(Continued)

OTHER PUBLICATIONS

Add a Guitar Strap to Your KeyBoard.
Strange Wearable Keyboard.
The Tummy PC: A Practical Wearable Computer.

*Primary Examiner* — Jose V Chen
(74) *Attorney, Agent, or Firm* — Device Patent LLC

(57) ABSTRACT

Embodiments of a wearable human body mounted electronic device support system are disclosed. The system provides the convenience of controlling a computing or gaming device while in a variety postures and movements including sitting, standing, and freely ambulating about a room. The system comprises a waist mount portion encircling a user's waist for supporting a load. A cantilevered portion extends from the waist mount portion for supporting an electronic input device at an ergonomic position beneficial to the user. The cantilevered portion comprises a projector extending generally anteriorly to form a support platform on which electronic devices are supported. The system may comprise a base to transfer forces from a projector into the waist mount. A portion of the cantilevered portion of the system is configured for instant coupling and uncoupling from the waist mount. In some forms a device coupler secures the electronic device to the support platform.

20 Claims, 25 Drawing Sheets

Related U.S. Application Data

(60) Provisional application No. 61/981,704, filed on Apr. 18, 2014.

(51) Int. Cl.
| | | |
|---|---|---|
| *A45F 3/14* | (2006.01) | |
| *F16M 13/04* | (2006.01) | |
| *A47B 23/00* | (2006.01) | |
| *A47B 23/04* | (2006.01) | |

(52) U.S. Cl.
CPC ...... *G06F 3/0202* (2013.01); *A45F 2003/144* (2013.01); *A45F 2200/0525* (2013.01); *A47B 23/04* (2013.01)

(58) Field of Classification Search
USPC .................................... 108/43, 50.01, 50.02
See application file for complete search history.

(56) References Cited

U.S. PATENT DOCUMENTS

| | | | |
|---|---|---|---|
| 3,541,976 A | 11/1970 | Rozas | |
| 3,610,622 A | 10/1971 | Haroski | |
| 3,785,647 A | 1/1974 | Bender | |
| 3,974,732 A | 8/1976 | Kester | |
| 4,256,007 A | 3/1981 | Streit | |
| 4,450,993 A | 5/1984 | Ephraim | |
| 4,715,293 A | 12/1987 | Cobbs | |
| 5,052,603 A * | 10/1991 | Spina | A45F 5/02 224/270 |
| 5,060,836 A | 10/1991 | Bradford et al. | |
| 5,074,222 A * | 12/1991 | Welch | A47B 23/002 108/43 |
| 5,088,634 A | 2/1992 | MacLaren | |
| 5,207,791 A | 5/1993 | Scherbarth | |
| 5,221,032 A | 6/1993 | Bott et al. | |
| 5,323,195 A | 6/1994 | Phillips | |
| 5,328,070 A * | 7/1994 | Lavi | A45F 5/00 108/43 |
| D357,035 S * | 4/1995 | Toles | D19/88 |
| 5,772,091 A | 6/1998 | Lackner | |
| 6,006,970 A | 12/1999 | Piatt | |
| 6,019,264 A * | 2/2000 | Strieber | A45F 5/00 108/43 |
| 6,053,383 A * | 4/2000 | Gunderson | A45F 3/14 108/43 |
| 6,137,675 A | 10/2000 | Perkins | |
| 6,199,732 B1 | 3/2001 | Swetish | |
| 6,213,363 B1 | 4/2001 | Norberg | |
| 6,659,545 B1 * | 12/2003 | McMillan | A47D 1/008 108/43 |
| 7,495,163 B1 | 2/2009 | Goodrich | |
| 7,665,641 B2 | 2/2010 | Kaufman | |
| 8,026,433 B2 | 9/2011 | Place et al. | |
| 8,267,294 B2 | 9/2012 | Yu et al. | |
| 8,418,629 B2 * | 4/2013 | Yu | A45F 5/00 108/43 |
| 8,418,900 B1 | 4/2013 | Baker | |
| 8,505,790 B2 | 8/2013 | Yu et al. | |
| 8,807,406 B1 * | 8/2014 | Thach | A45F 5/00 224/153 |
| 9,661,918 B2 * | 5/2017 | Janowski | A47B 23/002 |
| 9,750,332 B2 * | 9/2017 | Botticello | A45F 5/021 |
| 9,833,058 B2 * | 12/2017 | Bryant | A45F 5/00 |
| 2007/0119348 A1 * | 5/2007 | Evans | B60N 3/002 108/44 |
| 2011/0108597 A1 | 5/2011 | Kunow et al. | |
| 2011/0297711 A1 | 12/2011 | Yu et al. | |
| 2011/0297720 A1 | 12/2011 | Yu et al. | |
| 2013/0214022 A1 * | 8/2013 | Harvey | F16M 11/041 224/623 |
| 2015/0223590 A1 | 8/2015 | Arias-Tabima | |
| 2016/0198836 A1 * | 7/2016 | Fan | A45F 5/00 |

\* cited by examiner

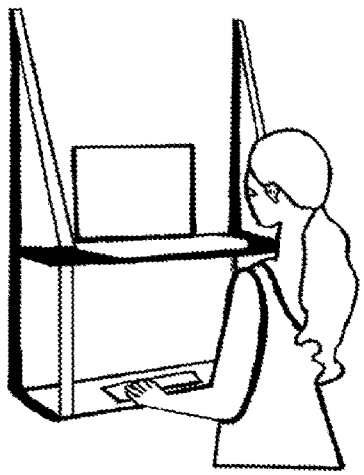
FIG. 3B
PRIOR ART
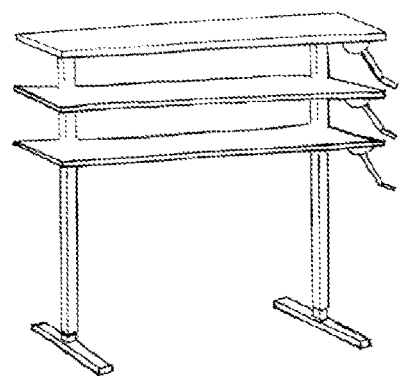
FIG. 4A
PRIOR ART
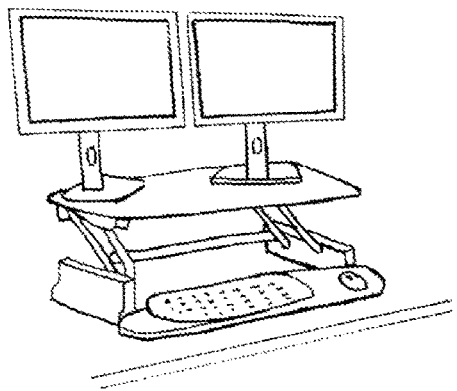
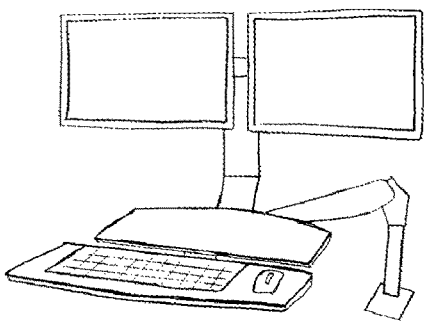
FIG. 4B
PRIOR ART

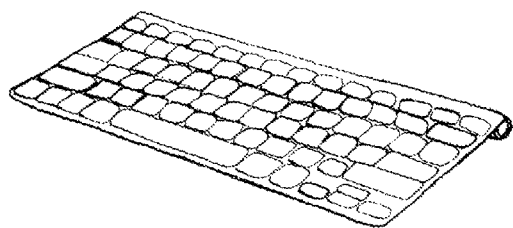
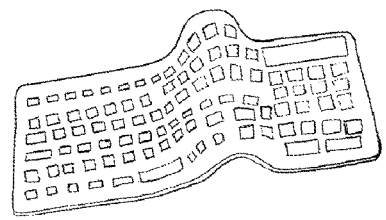
FIG. 6B
PRIOR ART
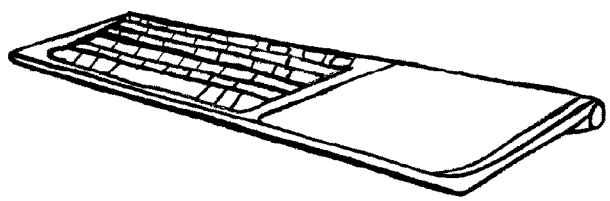
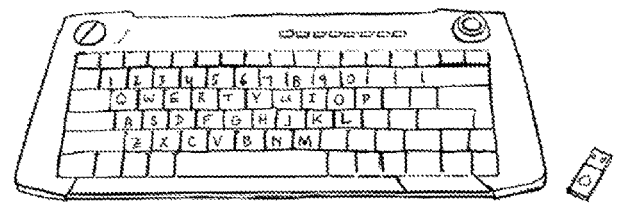
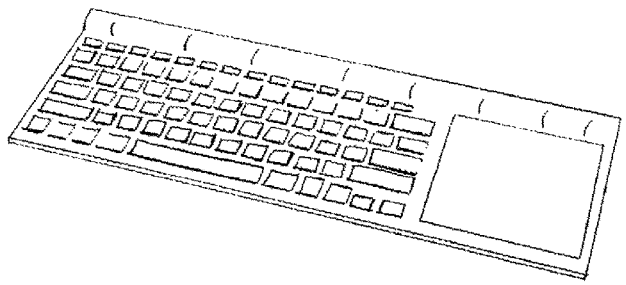
FIG. 6C
PRIOR ART

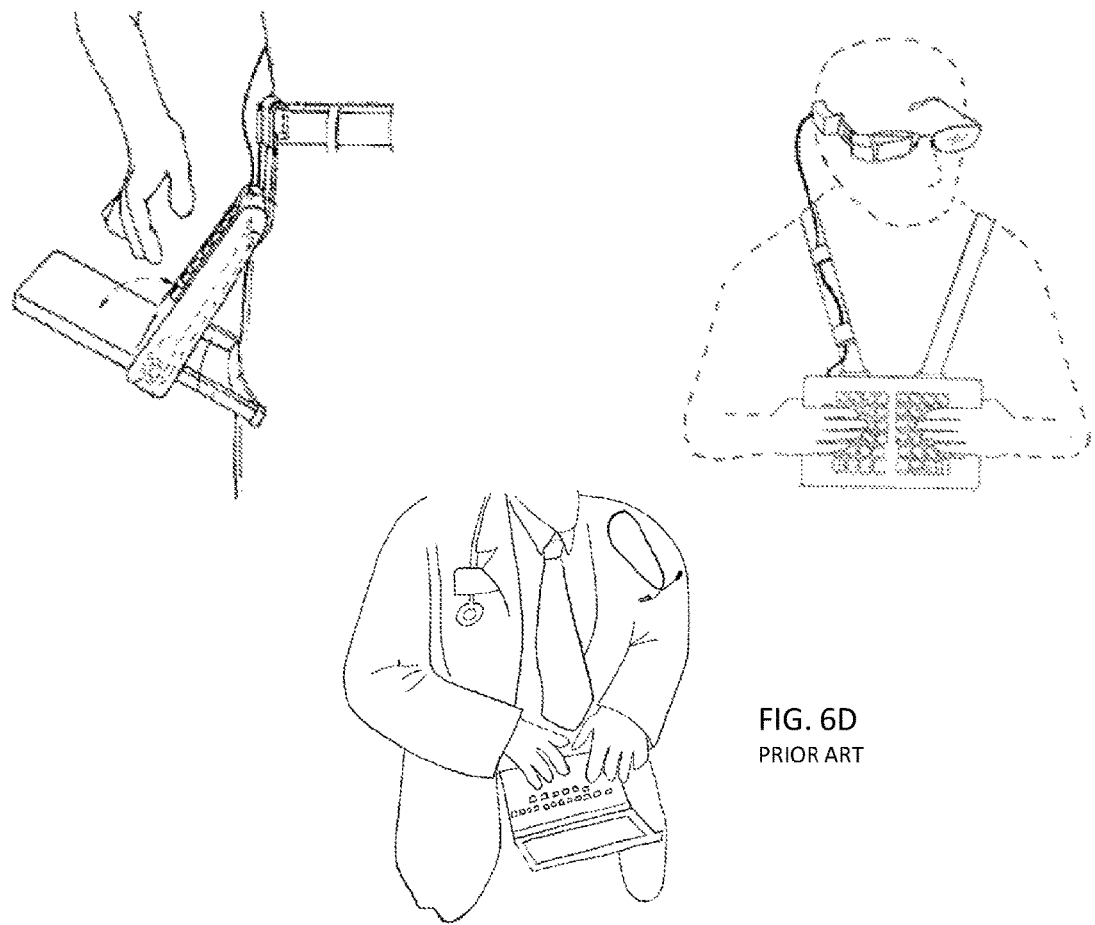
FIG. 6D
PRIOR ART
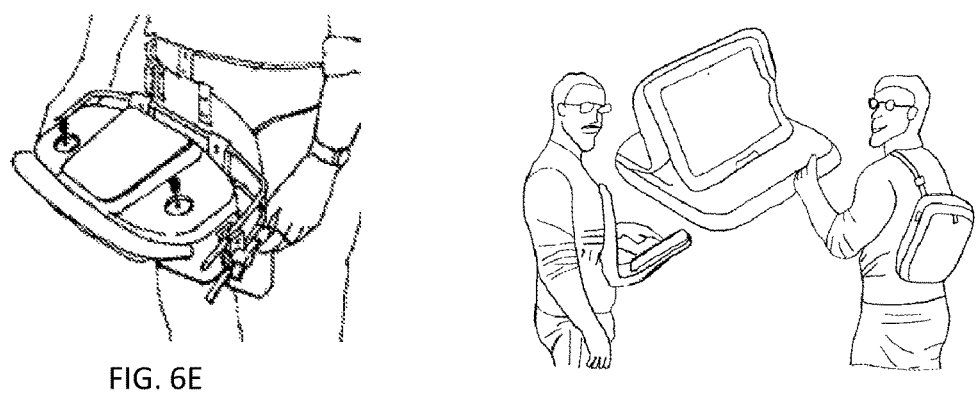
FIG. 6E
PRIOR ART
FIG. 6F
PRIOR ART

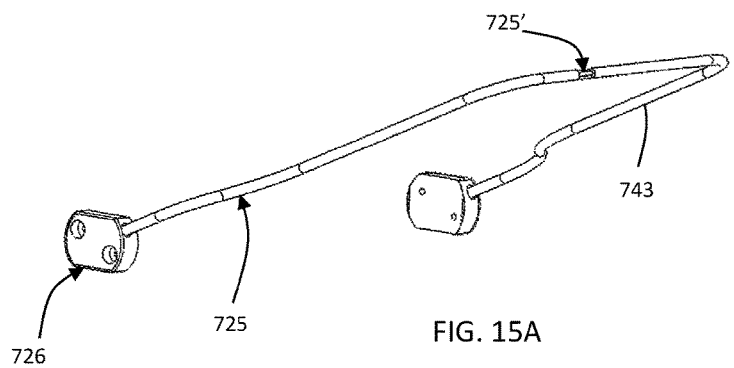
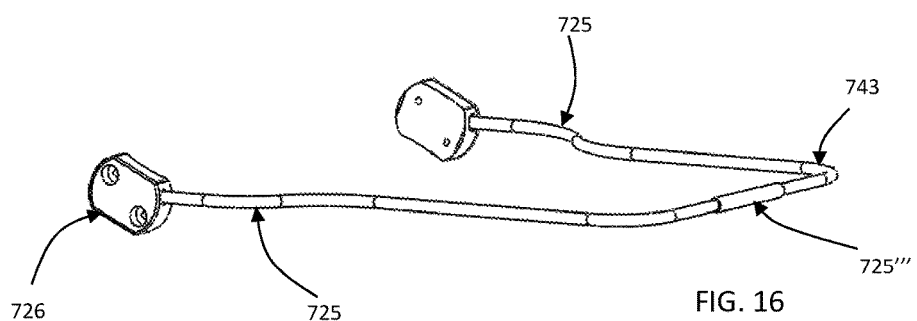
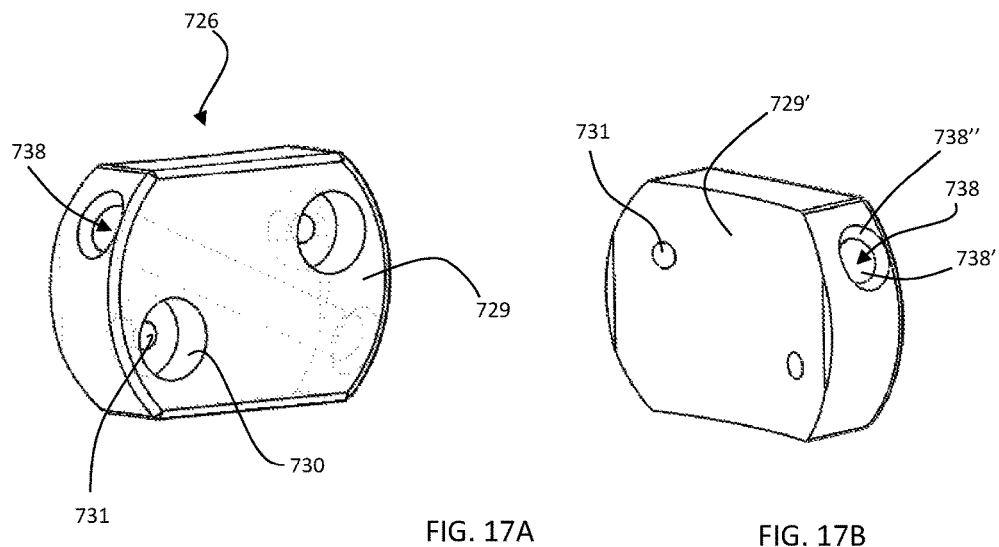

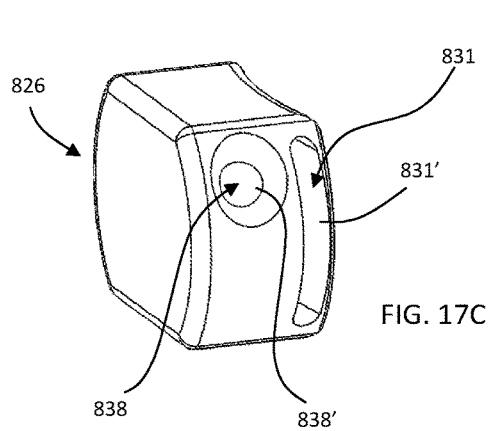
FIG. 17C
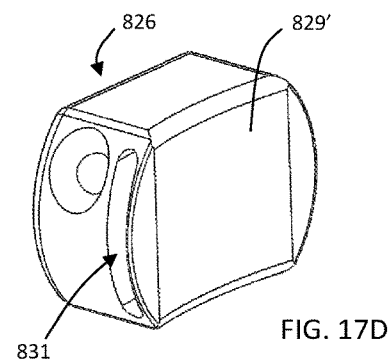
FIG. 17D
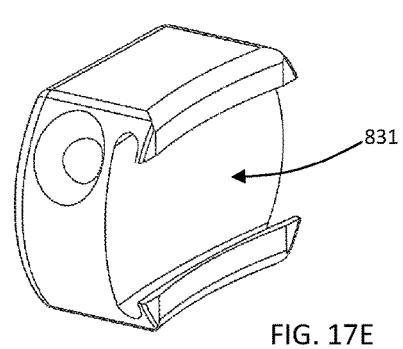
FIG. 17E
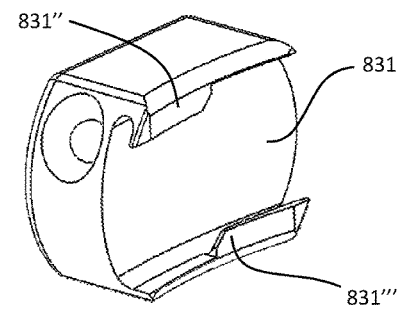
FIG. 17F
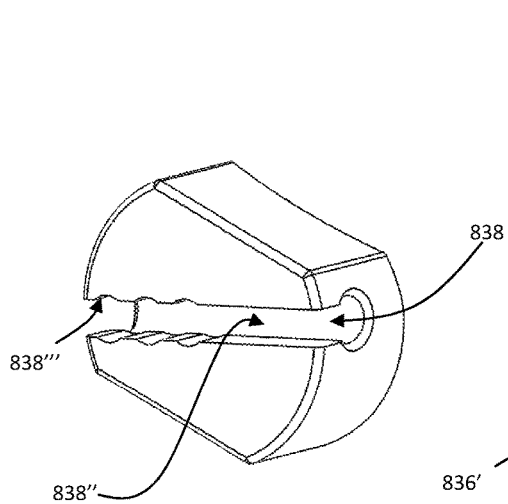
FIG. 17G
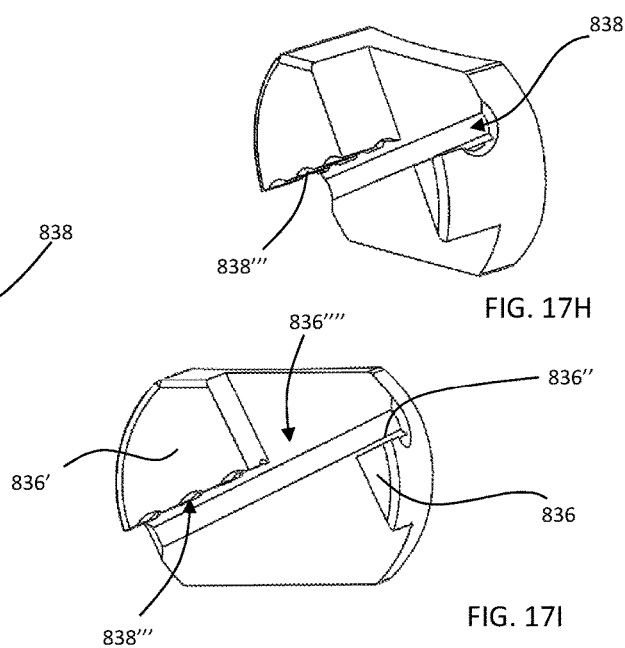
FIG. 17H
FIG. 17I

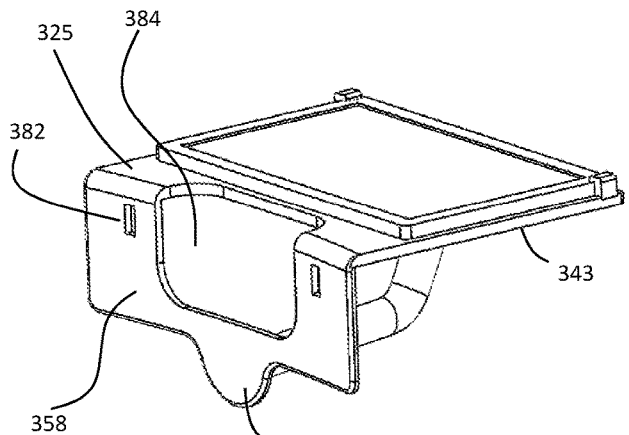
FIG. 21D
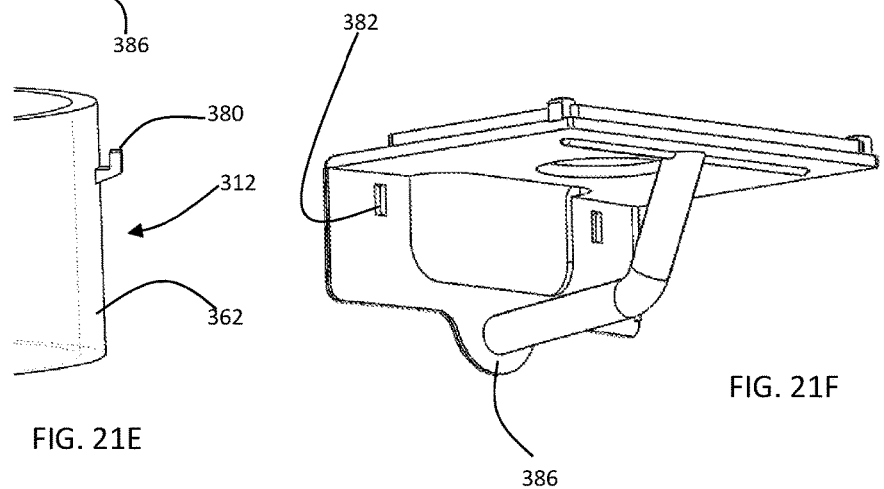
FIG. 21E
FIG. 21F
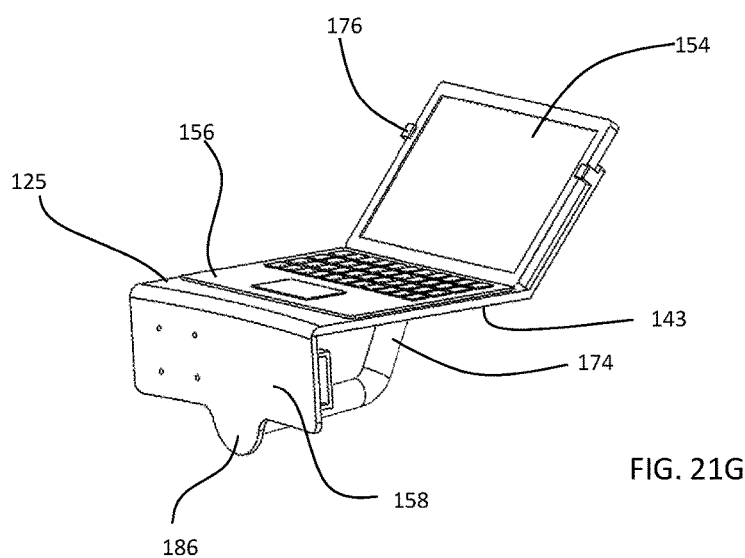
FIG. 21G

HUMAN BODY MOUNTED ELECTRONIC DEVICE SUPPORT SYSTEMS WITH ADJUSTABLE MONITOR VIEWING APPARATUS

CROSS REFERENCE TO RELATED APPLICATIONS

This Continuation In Part application claims priority to application Ser. No. 14/691,500 filed Apr. 20, 2015 which in turn claims priority to Provisional Patent Application No. 61/981,704 filed Apr. 18, 2014, the entire disclosures of which are hereby incorporated by reference and relied upon.

BACKGROUND OF THE INVENTION

Field of the Invention

The invention relates generally to human body mounted electronic device support systems, and more particularly to support systems for non-stationary use of electronic devices. The invention also relates to apparatus for adjusting the viewing height of monitors and to the use of mobile human body mounted electronic device support systems in cooperation with adjustable height monitors and monitor stands and boosters.

Description of Related Art

People widely use electronic devices such as computers for a variety of purposes including entertainment and work. Typically these users are seated when using these devices. In an office work environment for example, it is not unusual for every employee to be assigned an office chair, a desk, and a keyboard and mouse situated on the desk to input information into a nearby computer. Use of these devices in a sitting posture over extended periods of time has been shown to cause uncomfortable physiological symptoms and detrimental health effects. The physiological symptoms include fatigue, sleepiness, restlessness, muscle aches, back and neck pain, and in some cases depression. The health effects include muscle weakness, skeletal misalignment, muscle and joint tightness, disorders of the circulatory system commonly associated with inactivity, and other symptoms.

Workers experiencing the physiological symptoms described above and the detrimental health effects that grow over time ultimately become less effective in their work on a daily basis. Productivity in the work place suffers when this happens. In some cases it can even lead to failure of the organization.

Non-seated office solutions have been offered in the prior art to improve the health, comfort, and overall productivity of the worker who traditionally works in a seated position. One solution that has been presented is a work surface booster. The booster is typically in the form of an elevated platform configured to rest on the desk surface. Examples of boosters are shown in FIG. 1 and in FIG. 2. The booster creates an elevated work surface to support the worker's keyboard, mouse, or laptop/tablet at a height suitable for the office worker to use when standing next to their desk. These elevated platform boosters unfortunately require substantial desk space when on the desk and substantial floor space if lowered to the floor when not in use. Users complain the boosters clutter their work space and make it difficult to meet with others at their desk because the booster obstructs the use of the lower desk surface yet the elevated booster surface is too small for use by two. The top surface of the booster is elevated to a level higher than the desk surface therein creating a mismatch in height. Unlike a single level desk surface, papers are not easily slid to a different portion of the same surface. Users also complain of feeling fixed to the booster. The boosters are generally not mobile and therefore require the user to stand at a fixed location. Another problem with work surface boosters is that the boosted surface typically is elevated directly above the supporting desktop surface rather than towards the user. In this event, the user's knees and thighs will bump against the front of the desk as the user attempts to use the elevated surface therein annoying the user.

As an alternative to work surface boosters, elevated or standing desks are seen in the art. One example of a standing desk is illustrated in FIG. 3A. In these devices, the entire desk or work surface is vertically elevated so the worker can utilize the work surface at a comfortable height while in the standing position or on a tall stool. Often the amount the desk height is elevated is approximately the same as the length of the user's femur bone. Standing desks are generally fixed in height and those that are adjustable usually require the use of tools and a substantial investment in time to make the height adjustment. Another form of standing desk is illustrated in 3B capable for mounting to a door or wall.

Also in the art are on-demand adjustable height desks or work stations. Many of these devices typically include an elevator mechanism often in the form of a crank or electric motor effective to change the desk height on demand by the worker. One example of an adjustable height desk is illustrated in FIG. 4A where the desk surface is shown at three different heights. Adjustable height desks are not an effective solution in most situations for a variety of reasons. First, the mechanisms required in an adjustable height desk must elevate at least the entire top surface of the desk along with all materials placed on the surface including items such as books, monitors, phones, and computers. Together these items often weigh well over 100 pounds. In addition, the top surface of the adjustable height desk must be kept level during elevation and lowering therein adding to the complexity and strength required in the elevating mechanisms and ultimately the cost of the device. Furthermore, due to the complexity of the elevating mechanisms, adjustable height desks are rarely found in shapes other than rectangular and can be difficult to integrate with other office furniture cubicles. This is particularly true when trying to integrate an adjustable height desk into a confined office space or specialized work cubicle. Another form of adjustable desk surface is illustrated in FIG. 4B. Each of these devices are manually adjusted by hand using counter balanced springs. They have similar limitations to the work surface boosters described earlier.

As an alternative form of standing desk, the treadmill desk has been introduced to help the user exercise while working at their computer. These devices consist of a standard treadmill with an elevated work surface at the front of the treadmill. One example of this device is illustrated in FIG. 5. While walking on the treadmill, the user may use the work surface to support a computer, a monitor, a keyboard and mouse, and other various supplies or paperwork much like a normal desk. Although the concept works for some users, many users find it difficult to work at a stationary surface while walking since the stationary work surface is not in sync with the repetitive ambulation motion of the skeleton. The movement of the body makes it difficult to view the monitor screen, to operate the keyboard, and in particular to operate the mouse since the mouse will glide in unintended directions with each gait cycle of the user. These systems are costly and expensive for at least the reason that the desk portion must be designed with access to controls of the treadmill. An additional problem often encountered by users is the distracting noise and heat generated from the treadmill in operation. The treadmills can also require electrical demands that may require special wiring. Again, attempting to fit a treadmill desk into a traditional office or cubicle space is often difficult if not impossible.

Other solutions offered in the prior art to allow users mobility while computing include devices such as keyboards mounted to the forearm of the user for keyed input with fingers of the contralateral hand. This solution provides for only single handed entry to the keyboard and demands extensive retraining by the user due to the unnatural key and keyboard position. One example of this style keyboard is illustrated in FIG. 6A on the left. FIG. 6A (right) also illustrates various forms of mobile wireless keyboards found in the prior art that are hand supported. The primary defect of these devices is that they require support of the user's hand therein requiring the user to either type with their thumbs or with a single hand. These devices are not effective for extensive use because the keys are small and frustrating to use. Newer keyboards are now available in the prior art having a reduced foot print as illustrated in FIG. 6B. These keyboards are often known as mobile keyboards since they are well suited for travel and can fit into a computer bag to wirelessly operate a small computing device or to use on a user's lap to control a SMART TV. As illustrated on the right, some versions are flexible so they may be rolled up or folded. Although smaller than full sized keyboards, these keyboards continue to rely on the support of a table surface or lap and are not equipped for use by users moving about a room. FIG. 6C illustrates examples of wireless keyboards in the prior art that integrate cursor controllers in the form of an integrated trackball or touch pad. These keyboards also rely on a supportive surface in order to type with two hands.

There have also been attempts in the prior art to mobilize laptop computers using various mounting systems. In one configuration (FIG. 6D) the bottom of the laptop is mounted to the belt of the user therein orientating the keyboard in a generally vertical plane against the user's body U.S. Pat. No. 6,384,810. When the user wishes to use the device, the screen of the laptop is opened away from the keyboard into a generally horizontal plane. This keyboard and monitor orientation requires the user to look down for an awkward view of the laptop screen and further requires the user to type on a vertical plane without the benefit of a clear view of the computer keys. A similar design is mounted by a neck strap US20120293935A1 by Sherlock as illustrated in FIG. 6D on the right.

Like the Sherlock device, other systems in the prior art attempt to mobilize electronic devices through the use of supports that comprise neck or shoulder straps or harnesses. Examples of such devices are illustrated in U.S. Pat. No. 6,006,970 by Piatt, U.S. Pat. No. 8,267,294 by Yu, U.S. Pat. No. 2,861,854 by Best, U.S. Pat. No. 4,450,993 by Ephraim, and U.S. Pat. No. 4,715,293 by Cobbs. Although appropriate for short term use, the straps and harnesses place loads on the shoulder and neck leading to user discomfort. In addition, the straps bind on clothing, are difficult to store, and can be challenging to don and doff.

Waist mounted support systems are also illustrated in various prior art. Norberg discloses in U.S. Pat. No. 6,213,363 a device for supporting a game controller (FIG. 6E) The device utilizes a pair of arms on each side connected to pivot joints to allow pivoting around a horizontal axis in addition to mechanisms for pivoting the hand controller. This complex assembly encircles the controller obstructing free movement of the user's hands, is cumbersome to don and doff, has a large profile that is difficult to store, and includes too many mechanisms for practical use. Due to the methods used for securing to the user's body, the controller hangs near a user's groin. In standing, this position may work for controlling a joystick but is a poor ergonomic position for controlling other devices such as a computer keyboard or mouse.

Illustrated in FIG. 6F is a device from the prior art illustrating a purse worn around the waist during use or carried around the shoulder when not in use. The purse opens to expose the screen of a tablet computer. In an operative mode, the screen is located adjacent to the body. The user is therefore forced to hold their elbows out from the body in order to swipe and operate the screen in addition to positioning their neck as if looking at their toes. Although suitable for short term use, the device presents ergonomic barriers for long term use.

In one form, Scherbarth discloses a waist mounted universal support for hand operated devices in U.S. Pat. No. 5,207,791. This device utilizes a multitude of pivot adjustments and locks between elongated connectors to facilitate use of the device in both upright and sitting positions; however this requires the step of reconfiguring the device at the pivot joints. A hand operated device such as a keyboard would be supported along a narrow mid-sagittal plane of the device. The system lacks support for the user's wrists as well as the ability to prevent wobbling of the keyboard from side to side as a user attempts to use keys towards the lateral sides. Although the pivot adjustments are beneficial for converting the device between its standing and sitting functions, the linkage and pivots prevent the user from achieving certain beneficial ergonomic positions and add weight to the support assembly. As illustrated in FIG. 6G, when the hand operated device is positioned a suitable distance from the user's body, the user's forearm is flexed well above horizontal thereby inducing strains on the user's wrist that may cause injury with extended use. The Scherbarth disclosure does not discuss methods for attaching the device to a user's waist. Donning of the device is challenging since generally one hand is needed to support the electronic device, another hand to wrap the belt around the waist, and a third to fasten the belt in a locked position. Once removed from the user's body, there is no obvious way to reduce the device to a smaller footprint for storage. The device is therefore likely to occupy valuable desk space on a user's desk.

In U.S. Pat. No. 7,495,163, Goodrich, discloses a wireless musical keyboard mounted to a waist belt. The device utilizes a pair of extension members extending from a belt member. The extension members pivot relative to the belt, and additional pivot members are located under the keyboard so that the keyboard can freely reposition laterally during a musical performance apparently for visual effect. Although perhaps conducive to a musical performance, free lateral movement when attempting to control a device such as a computer would be disruptive. Kunow, in US2011/0108597, discloses a "rigid yet flexible" support brace (FIG. 6H) that partially encircles a user's waist and is adaptable for supporting a musical instrument and in some forms electronic equipment such as laptops. The disclosure fails to teach how devices placed on the extended arms are prevented from falling off or how the open support brace maintains its position on a user's waist especially with movements such as walking, bending, or jogging. Kunow also indicates the device utilizes "a back support section configured to wrap around a back of a user, a front support section with spaced apart ends respectively configured to rest on a hip of the user". These two sections are offset from each other by several inches creating an awkward three dimensional shape. Although Kunow indicates that the support belt may be folded for storage, he only broadly suggests it can be done while retaining the rigidity necessary to maintain position around a user's waist while carrying a musical instrument such as a saxophone or laptop.

What is needed are ergonomically correct human body mounted support systems for electronic input devices such as wireless computer mice, computer keyboards, combination mouse-keyboards, or game controllers, and in some cases for support of tablets, laptop computers, and similar devices. The support systems should be proficient for use in a plurality of stationary and non-stationary configurations such as sitting, standing and non-stationary positions such as walking, jogging, running, or freestyle movements. It is preferable that embodiments of the support system be adaptable to support one or more styles of commercially available wired and wireless electronic input devices or specialized input devices preferably configured in weight, size, and integrated features for mobile use including instantaneous attach and release to support systems. The support system should also be easily and quickly mounted on and released from the human body. In addition, the support system should orientate the electronic input devices in standard positions that are familiar to users. For example, support systems for computer input devices such as a keyboard or mouse should preferably position these devices as if supported by standard horizontal or tilted from horizontal desktop orientations used by most users. In addition, it is preferable that devices are supported such that the user's humerus is orientated generally vertical and forearms are generally perpendicular to the humerus during use for ergonomic benefit.

Also needed is a human body mounted support system configured to control electronic hardware such as computing device placed at a remote location distanced from the support system. The support system may also be configured to control electronic hardware such as a computing device held by the support system or placed elsewhere on the human body.

Needed also are human body mounted support systems that are not only easily donned and doffed, but systems that will also quickly assume a minimal size and shape to facilitate storage. This may include for example assuming a minimal footprint when stored on top or near the user's desk or workstation.

Also needed is a quickly and easily adjustable monitor height adjustment device with vertical travel adequate for a user to easily move from sit to standing while maintaining a consistent monitor viewing position. Forms of the aforementioned support system will provide users the ability to control input devices such as a computer keyboard and mouse from either a fully upright or sitting position. Many standard computer monitors are capable of a vertical height adjustment of less than 5 inches but this distance in most instances is not adequate for users changing between sitting and standing positions while maintaining a monitor height at an eye level that eliminates the need for the user to tip their head up or down in at least one of the sitting or standing positions.

BRIEF SUMMARY OF THE INVENTION

Various embodiments of electronic device support systems for mounting to the human body of a user are disclosed herein. In preferred embodiments the support system is mounted at the user's waist and is configured to support computer input devices such as; a wireless computer keyboard, a wireless computer mouse, both keyboard and mouse, a unified keyboard mouse, or game controller. In most cases, these input devices are used to control a remotely located computer or game console. In other embodiments, the support system is configured to support a tablet style computing device. The tablet style device may utilize a touch screen or be a tablet with complementing tablet keyboard such as an ultra-thin keyboard using force sensitive keys. In another embodiment, the support system may be utilized to support a small laptop style computer. The support system is configured to promote computing ergonomics and minimize weight to ease user fatigue.

In one form, the support system includes a support platform on which common electronic devices such as a keyboard and mouse are placed and supported sometimes with the assistance of a device coupler. In other forms, the support system or portions of it are integrally connected to the supported electronic device. In yet other forms, the supported electronic device is releasably connected to the support structure using a fixation coupler such Velcro, snaps, clips, bands, magnets or other functionally equivalent mechanisms.

In preferred embodiments the electronic device support system is mounted on the user's waist. The user's waist is a preferred location for attaching the support system to the user's body since it easily tolerates supporting small weights with little discomfort. The waist is also near the core of the body such that movements that occur at the waist are transmitted to the upper extremities. For this reason, electronic devices mounted to the waist of a user are easier to control with the hand since movements transmitted to the waist through a walking motion for example, are also simultaneously transmitted to the upper extremities. The motion induced into the electronic device at the waist is in sync with the motion induced into the upper extremity. Users will have a very different experience for example when attempting to control a table mounted electronic device while walking on a treadmill. Here, motion in the user's upper extremity will be out of sync with the table mounted electronic device resulting in difficulty controlling the electronic device.

The waist mount may assume a variety of forms and may be rigid, semi-rigid, flexible, or a combination thereof. In preferred forms, the support system utilizes a waist mount in the form of a belt. The utilized belt will have size, shape, and material properties sufficient for carrying the loads placed upon it. The belt may include features such as holes or linear or non-linear slots for adjustable attachment of a base or projectors. The belt may be secured as a full loop using a closer usually in the form of a buckle, snap clips, Velcro loops, or other mechanisms known in the art.

In preferred forms a cantilevered portion extends from the waist mount portion or from a base mounted to the waist mount portion. The cantilevered portion comprises a projector portion and a support platform portion and may further comprise a fixation coupler, a device coupler, and electronic devices attached to it. In some forms, the cantilevered portion is generally aligned in a single plane and may be fixed or removable from the base or waist mount portions. In other forms, a proximal end of the cantilevered portion may include a support portion that extends obliquely from the generally single plane.

In preferred embodiments, a base is secured to the waist mount and comprises a receiver configured for instantaneous coupling and uncoupling of a projector. The projector portion extends into a support platform portion upon which electronic devices are secured. In other embodiments, disposed on the support platform is a device coupler on which the electronic devices are secured. Fixation couplers may be used to hold the device coupler to the support platform. The computer keyboard and mouse may be mounted directly to the support platform, secured with retainers on the support platform, or mounted to a device coupler fitted to capture components such as the keyboard, mouse, or tablet. Coupling between a projector and a waist mount portion may comprise a variety of coupling relationships. For example, the coupling may be male to corresponding female wherein a projector portion has a female orientation however in other embodiments the projector may have a male orientation.

In some embodiments the projector may be configured to be removed, released, or to swing out of the way to ease donning or doffing the support system. In addition, in preferred embodiments the system is configured for transition between an operational and storage configuration. It is also preferred that from the operational configuration that components of the system can be instantaneously removed from the body, then configured in a storage configuration having a smaller footprint and therein well suited for nearby storage when needed again. For example, in a preferred embodiment the projectors and support platform with attached unified keyboard and mouse are placed on a wall mounted hook or desktop stand whereby the projectors and electronic devices are stored upright thus requiring minimal space on the user's desk. Also in preferred embodiments, a waist mount is foldable to be substantially flat and stores below the keyboard and projector holding the electronic device whereas to not require any additional desk space. For example, when the waist mount is in the form of a belt, the belt may have pre-formed folds. Once removed from the user, the belt easily folds at these pre-formed fold locations into a predetermined size for storage. The pre-formed fold locations may be in other forms such as an area where the belt material is thinner, comprises a more flexible material, or comprises a memory material to induce automatic folding when the belt is removed. Magnetic materials, snaps, Velcro, or other mechanisms may be used to encourage the belt to fold into its storage configuration.

In some forms, the projector is readily adjustable to provide tilting from horizontal of the attached electronic device. In preferred embodiments this tilt feature is integrated into the base. For example, the base may comprise a coupling interface wherein complementary splines provide for tilting at various angles. In some forms, the coupling interface is quickly adjustable for release and/or adjustment of tilt angle. In some forms, the projector is biased wherein a user manually overcomes a biasing force for release or adjustment. For example, the projector may be in the form of a U-shaped metal rod or rod assembly. Manually deflecting the rod provides for release or adjustment of the coupling interface. In other embodiments, the tilt feature is located between the attached electronic device and a portion of the support system.

In some forms the base is formed within the waist mount. In other forms, the base is secured to the waist mount.

The support system may be configured to accommodate to a range of waist sizes. The waist mount for example may be available in a variety of lengths to encircle a user's waist. The waist mount may be adjustable and include for example; a belt buckle adjustable to various hole positions on the belt, an adjustable Velcro loop, or an adjustable length snap buckle to name a few. In some configurations, a user's waist size may affect the projectors. For example, in some embodiments, projectors may extend from a base located on each opposing lateral side of the belt. For this situation, the belt may include laterally placed adjustment slots or holes to adjustably position the base on the belt to obtain a predetermined width between projectors.

Likewise, in some configurations the opposing projectors are operationally joined and may requirement adjustment. For example, in one form, the ends of each projector are threaded and joined by a turnbuckle wherein rotating the turnbuckle causes each projector to move closer or further from the other. In other forms, the ends of each projector are mechanically engaged by a tongue and groove, rod and cylinder, or similar configuration. Width locks may be utilized to secure a preferred width between projectors.

In some configurations, the support platform is secured to a device coupler supporting the electronic device. Fixation couplers such as snap fittings, clamps, adjustment holes, slots or similar functional features may be utilized in cooperation with the device coupler to accommodate for lateral adjustment of the projectors.

The projector may assume a variety of shapes and forms. In one form, the projector is elongated in the form of a bent rod or tube. For user's with smaller waists, the projectors may be relatively straight since the lateral width of the waist may be similar to the width of the keyboard to be supported. For user's with larger waists, the projectors may have an inward jog to reconcile the larger lateral width at the user's waist to the smaller width of a supported keyboard. These width adjustment features at the belt end of the projectors, at the support end of the projectors, and by the magnitude of the projector jog make for a desirable fit on the user. In addition, these adjustment features can provide for a reduction of inventory since one set of parts are adjustable between a range of user sizes.

The base is preferably configured for quick if not instantaneous attachment and release of the projector. In some forms the projector is fitted into a receiver on the base such as a cylinder aligned with the projector. In other forms the projector is deflected manually by the user and then springs back into an elongated groove. In other forms, the projector is elevated upwards then wedged between two spaced opposing stops. The system is configured using a plurality of projectors in some configurations and a single projector in others. In single projector configurations, the projector may be orientated medially at the front of the body however the projector may also be orientated laterally on one side. When oriented lateral the projector with attached keyboard rests laterally along the user's body until rotated upwards then is rotated generally across a transverse plane until it rests in the operative position.

The base may be secured to the waist mount using fasteners, adhesion, or other methods. Alternatively the base may include a channel for containing the waist mount therein for supporting the base. The waist mount, usually in the form of a belt, is fed through the channel or the waist mount may be captured between flanges defining the channel.

In some forms the base may be integrated with the projector. In this event, the base and projector may be releasable together from the waist mount. In other forms the waist mount may be configured to receive the projector without an obvious base. For example, a pocket or sewed in sleeve may be formed on or within the waist mount to serve as a receiver for the projector.

The support system may be functionally utilized when the user is in a sitting, standing, or other upright positions that are substantially stationary. The support system may also be utilized when the user chooses to be non-stationary such as when ambulating or freely moving about a room. In an operational configuration of the preferred embodiment, the support system orientates the keyboard in a generally horizontal position or a position wherein the keyboard is tilted up or down usually not more than +/−20 degrees from horizontal. These positions are generally similar to the common orientations of a keyboard placed flat on a desktop or a keyboard with supports to elevate the distal edge of the keyboard to tilt the keys slightly toward the user. However, some users believe elevating the proximal edge of the keyboard offers a better ergonomic position.

In some embodiments, a wireless keyboard and wireless mouse are placed on or secured to the support system. With the support system secured to the user, the user is able to control with the wireless keyboard and mouse a remotely placed computer and associated monitor or gaming system while performing a variety of skeletal postures or body movements while moving freely around a work or play area.

As an example of a method of use of a preferred embodiment, a user may begin to experience fatigue as they sit in their desk chair controlling the keyboard and mouse positioned on their desk. The user decides a change in position and/or movement is needed to rid the fatigue but also to experience the health benefits of being upright and moving while working. The user lifts the waist mount off a support system stand. The waist mount is unfolded or unrolled if stored in a folded, rolled, or other orientation for size reduction. The waist mount in the form of a belt is wrapped by the user around their waist and secured to a desired tension using an appropriate belt buckle position or other circumferential adjustment. Bases are pre-mounted to lateral sides of the belt and positionally pre-adjusted over each lateral pelvic crest. A keyboard with integrated mouse (or alternatively a keyboard and mouse) are pre-secured to a support platform of a cantilevered portion. The cantilevered portion is lifted by the user off a support system stand which hangs from a wall or resides on a desktop. In alternative embodiments, an electronic device such as a keyboard and/or mouse are secured to a support platform after the cantilevered portion is secured to a waist mount portion. In this embodiment, the system utilizes two opposing projectors. The projectors are aligned with each base and coupled with the complementary support receivers included in each base. In this embodiment the user has the option to adjust the projector in the base to vary to distance of the keyboard from the user's body to an optimal ergonomic position. In some embodiments the user may adjust the upward/downward angulation of the cantilevered portion with respect to a waist mount. The user may then engage any secondary supports in the support system (if present) for minimizing motion in the projectors when typing or moving the mouse. The user may then choose to adjust their monitor height. In some cases this monitor adjustment may be as much as 16-20 inches or more vertical adjustment in order to view the monitor at eye height. The user may then choose to rest their wrists on the systems wrist rest and begin controlling their computer through keyboard and mouse supported by the system as they stand or freely move about the room. If the user desires a break from standing, they may continue to utilize the support system in the sitting position after lowering their monitor.

When the user is done using the system, the user grasps the keyboard or attached projectors and instantly uncouples the unit from the base by pulling the projectors in an anterior direction. Many examples of other coupling and uncoupling are methods are described elsewhere in this specification. The keyboard and projector unit is returned to the support system stand. The user may choose to leave the belt secured at their waist while engaging in other tasks for later use, or may remove the belt, refold it and place it on the designated support corral on the support system stand.

The user mounts the electronic device support system to their waist and secures the keyboard and mouse on the support by the use of friction, Velcro, snaps, elastic bands, spring biased clips or other connection method. The user continues to control the remote computer utilizing the keyboard and mouse on the support system that is secured to the user's body. This control is operable by the user regardless of whether the user stands in place, walks in place, or freely moves about the room. The user may choose to sit again in their desk chair and continue operation of the keyboard and mouse while using their heels to scoot or spin the chair. Using the support system the user is no longer obligated to remain stationary in a chair in front of a keyboard and mouse situated on the surface of a desk. In alternative embodiments, a projector portion extends directly from the body of an electronic device and therefore does not require mounting to a support platform portion. For example, in one embodiment a keyboard with integrated mouse comprises one or more projectors extending from the keyboard. The one or more projectors is configured for quick or instant coupling and uncoupling from a waist mount.

In some embodiments, the support system may include forearm or wrist rests to assist the user in relaxing some of the upper arm musculature while using the electronic devices.

BRIEF DESCRIPTION OF THE SEVERAL VIEWS OF THE DRAWINGS

These and other features and advantages of the present invention will become more readily appreciated when considered in connection with the following detailed description and appended drawings, wherein:

FIG. 3B is a perspective view of a another form of standing desk of the prior art;

FIG. 4A is a perspective view of a form of adjustable sit to stand desk of the prior art;

FIG. 4B are perspective views of forms of adjustable height work surfaces of the prior art;

FIG. 6B illustrates perspective views of wireless mobile keyboards of the prior art.

FIG. 6C illustrates perspective views of wireless keyboards having an integrated trackball or trackpad.

FIG. 6D illustrates some examples of prior art devices.

FIG. 6E illustrates an example of a prior art device.

FIG. 6F illustrates an example of a prior art device.

FIG. 15A is a side perspective view of a base, projector, and support platform including a joint for adjusting the width between projectors.

FIG. 15B is a top perspective view of the tongue on one side of the joint illustrated in 15A.

FIG. 16 is a top perspective view of a base, projector, and support platform with an alternative turnbuckle style width adjustment between projectors.

FIG. 17A is a side perspective view of one form of a base.

FIG. 17B is an opposing side perspective view of the base in FIG. 17A.

FIG. 17C is a front perspective view of a base comprising a belt receiver.

FIG. 17D is an opposing side perspective view of the base of FIG. 17C.

FIG. 17E is a side perspective view of a base illustrating another form of belt receiver.

FIG. 17F is a side perspective view of a base illustrating another form of a belt receiver.

FIG. 17G is a side perspective view of a base illustrating a lateral slot for side entry of a projector.

FIG. 17H is a front side perspective view of another form of base comprising an entry portal between a primary and secondary post.

FIG. 17I is a side perspective view of the base illustrated in FIG. 17H.

FIG. 21D is a proximal perspective view of a cantilevered portion of an electronic device support system with integrated windows for mounting on a belt.

FIG. 21E is a side perspective view of a belt with integrated hook for securing the cantilevered portion of the electronic device support system illustrated in FIG. 21D.

FIG. 21F is a distal perspective view of FIG. 21D.

FIG. 21G is a proximal perspective view of a mobile tablet with attached keyboard mounted on the cantilevered portion of an electronic device support system.

DETAILED DESCRIPTION OF THE INVENTION

Referring to the figures, wherein like numerals indicate like or corresponding parts throughout the several views and are offset by a multiple of 100. For example, pubic ear 386 may be in various embodiments as 286 or 186. Similarly, projector 125 may be illustrated in various embodiments as 225, 325, 625, 725, or 1125 or other similar numerals. Similarly, support platform 43 is identified in other embodiments with numerals such as 743, 1143, 1243, 1343.

Figure 7:
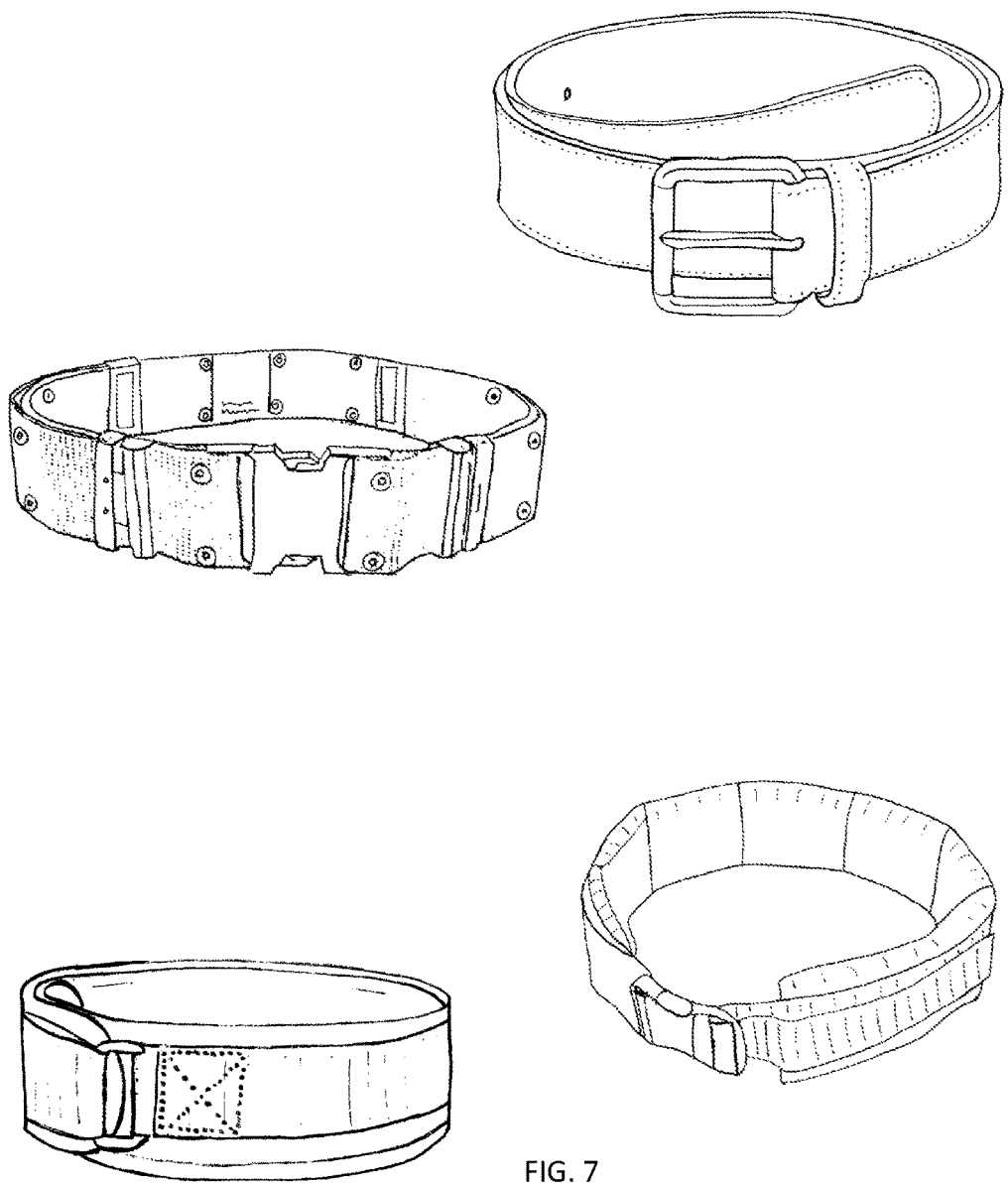
FIG. 7 illustrates perspective views of various forms of belts of the prior art.
Figure 8:
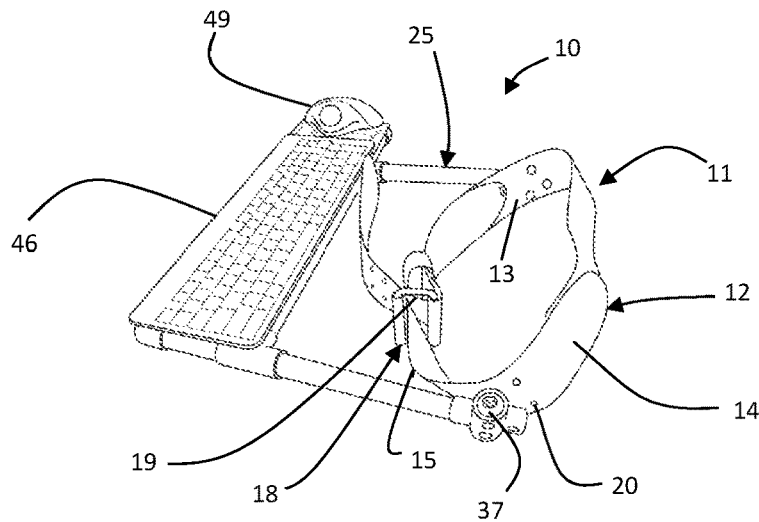
FIG. 8 is a top side perspective view of one form of an electronic device support system.
Figure 9:
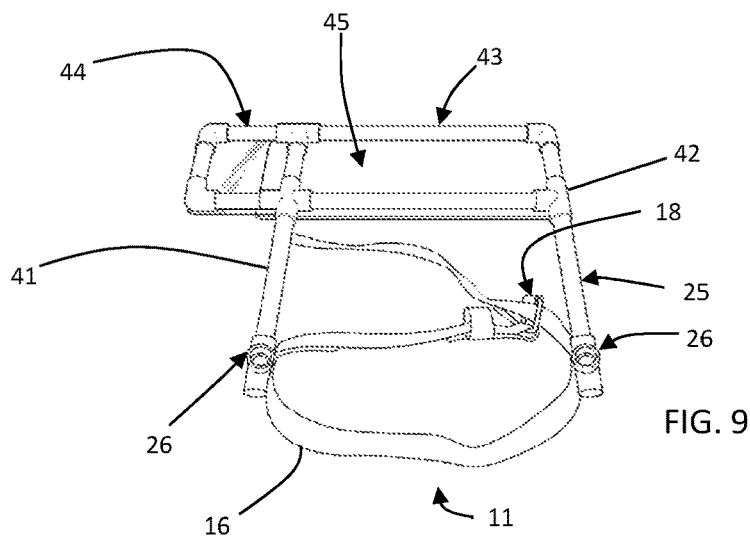
FIG. 9 is a bottom perspective view of one form of an electronic device support system.

FIG. 8 illustrates an embodiment of one form of an electronic device support system 10 with keyboard and mouse. The system comprises a waist mount 11. The waist mount is of sufficient rigidity and strength to firmly control the downward forces and torques created by the weight of the support system 10 and the electronic devices mounted to it and the weight of the user's hands and wrists. The waist mount 11 transmits these forces to the user's body through a inner wall 13 residing against the body of the user. In one form, the waist mount is in the form of a belt 12 completely encircling a user's waist. The belt 12 may be manufactured from leather, leather substitute, nylon mesh, or other materials of sufficient rigidity, strength, and flexibility to conform to a user's waist while supporting the electronic devices and in some cases the user's wrists and forearms. A light duty construction belt or weight-lifter's belt has worked well in prototypes as illustrated in FIGS. 8-12, however it is contemplated that the belt may assume other forms or styles. Some examples of other belt forms are illustrated in FIG. 7. Utility belts or casual or dress belt such as these may be configured to provide sufficient functional support. In some forms the belt may be padded for comfort. The belt 12 comprises an inner wall 13 for resting against the user's clothing and body, an outer wall 14, an upper wall 15 spanning between the inner wall 13 and outer wall 14, and a lower wall 16 also spanning between the inner and outer wall.

For comfort, the waist mount 11 may be padded with a material such as foam or lined with a soft material although the prototypes have proven comfortable without the additional comfort materials. The waist mount 11 may include a closer shown in FIG. 8 in the form of a belt buckle 18 manufactured here of metal. The buckle 18 in FIG. 8 is a frame-style type having a plurality of prongs 19 rather than a single prong to help reduce misalignment between the two ends of the belt thereby offering better support to the support system. The buckle 18 may be in multitude of other forms not limited to plate style, box-out, seat-belt, or box-frame buckles. Other styles of closers may be effectively used. For example, a Velcro style closer (FIG. 7 bottom left) wherein one end of a belt is fed through a loop at the opposing end of the belt, tightened to a desired amount, and then laid over the opposing Velcro surface to secure the belt in place. As another alternative, a slide-squeeze (side release) buckle (FIG. 7, middle) may be utilized wherein a male component usually having two extended prongs on one end of the buckle slides into a female portion and releasably interlocks. The benefit of this type of closer is that the belt can be pre-adjusted to a desired length using a reducing loop therein assuring good fit for the user without need for readjustment. A multitude of other closers are well known in the art and would work with equal effectiveness.

Figure 10:
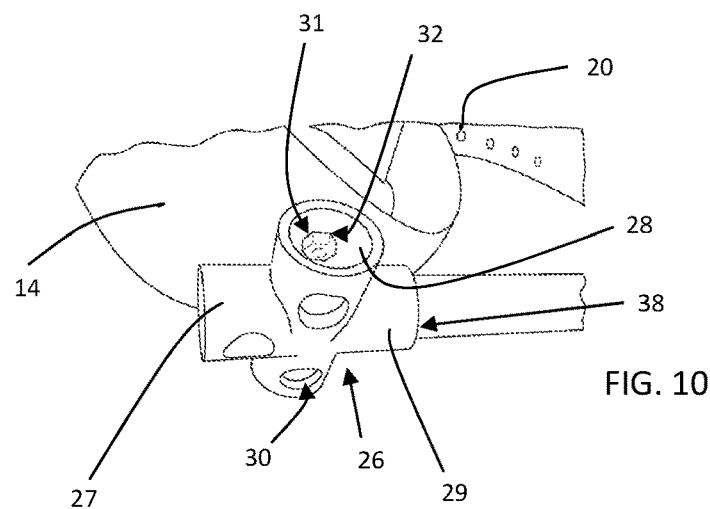
FIG. 10 is a top perspective view of one form of a base.

Body sizes of users of the electronic device support system will vary. Unless custom sized, it is preferable that the waist mount is adjustable to fit the user. For example, in belt style embodiments using a buckle having prongs 19, a plurality of adjustment holes 20 span between the inner and outer belt surface as seen in FIGS. 8 and 10. The user may select from these adjustment holes 20 to create a preferred belt circumference best suited to fit at the waist of the user. An array of alternative features to adjust the circumference of the belt may be utilized. Examples include pulling excess belt length through a belt reducer or strap adjuster.

Extending anteriorly from the waist mount 11 is a projector 25. The projector may be fabricated in a variety of forms and serves as at least a portion of the support system for the electronic devices. The projector 25 is secured to the waist mount at the base 26.

The base 26, illustrated in FIG. 10, is secured to the outer wall 14 of the belt. In this embodiment, the base is a PVC connector 27 that is of a four-way female form. The connector 27 comprises an inner surface 28 and outer surface 29. Three access holes 30 are drilled through a first outer surface 29 sufficient in diameter to pass the head of a nut driver. Generally collinear to these three access holes 30 are smaller anchor holes 31 (covered by nut) sufficient to pass the shaft of a fastener. A pattern of these three holes 31 is duplicated on the outer belt wall 14 at a position to maximize support from the belt 12 when the base 26 is secured to it. The pattern of three holes 31 is again extended between the inner and outer wall 13, 14 of the belt. The base 26 is then secured to the outer wall 14 of the belt utilizing a fastener assembly 32 as illustrated in FIG. 10. In this embodiment, the fastener assembly 32 comprises a flat head machine screw seated within a cup washer and flat washer capped off by a lock nut with a nylon insert.

In this embodiment, the base 26 is in the form of a four way female PVC connector 27 that serves several purposes in addition to securing the projector 25 to the waist mount 11. For example, at the superior end of the base is a superior receiver 37 configured to receive an elbow rest (not shown) wherein the user may reduce fatigue on their shoulders by at least partially supporting the weight of the arms on the elbow rests and therefore through the waist mount. The anterior receiver 38 on the PVC connector 27 is configured to receive a projector 25 for supporting of the electronic devices. Posteriorly on connector 27 is a posterior receiver 40 configured to optionally receive a counter balance weight to reduce torque forces on the waist mount if the user so desires.

With experimentation, it was learned that due to the common lumbar lordosis in the lower spine and pelvis, torsional forces applied through the base 26 will cause the projector 25 to dip downwards toward the floor approximately 20 degrees. For this reason, the base 26 positioned on belt 12 adjacent each of the far lateral sides of the pelvis was removed, derotated 20 degrees then re-secured to the belt. The derotation re-aligned the projector to a preferred generally horizontal plane or a plane where the keyboard is slightly upwards towards the user's upper body.

In this embodiment, each base 26 was secured to the belt at a position adjacent to the lateral sides of the pelvis. Deflection in the belt away from the user's body due to torsional forces are minimized since the belt travels along a sagittal plane at this location. When the base 26 is connected to the anterior portions of the belt, the belt 12 has less capacity to counteract the torsional forces from the projector 25 and the electronic devices and will begin to tilt downward towards the floor. The upper portion of the belt deflects away from the body therein unable to prevent the projector from tipping downwards. Other methods are available to minimize deflection of the upper wall 15 from the user's body especially when the base 26 is attached to belt 12 anteriorly. For example, the belt by be stiffened in areas prone to deflection. Increased stiffness may be accomplished by thickening of the belt anteriorly or along the superior anterior wall, or the belt may be reinforced with stiffer materials in selected areas where it is prone to undesired deflection. Other methods of providing support to counteract downward deflection include for example, utilizing one or more additional support struts 439 (FIG. 20) extending between the support platform and the lower wall of the belt 12.

In the current embodiment illustrated in FIGS. 8 through 12, the projector 25 is in the form of a pair of tubes 41 extending anteriorly from each base 26. The tubes 41 intersect with other junction fittings 42 that together form a support platform 43. Here the support platform 43 is utilized to support a wireless computer keyboard 46 (FIG. 8). Support platform 43 may be extended to create an extended platform 44 area for components such as a computer mouse 49. In this embodiment, the platform 43 is extended to the right but may be extended left. If desired, a device coupler 45 may be positioned over the support platform 43 or extended platform 44. Here, the device coupler 45 is formed from of a sheet of polycarbonate of about a ⅛" thickness and is secured to the support platform 43 using fixation couplers such as fasteners, snaps, adhesives, or other methods known in the art. In some forms, the device coupler 45 may be made unified with the support platform 43. In some forms the tubes 41 and junctions 42 may be assembled by friction fit however it is preferred that adhesive is utilized between the tubes 41 and junction fittings 42 as an additional means of securely joining the parts.

Figure 11:
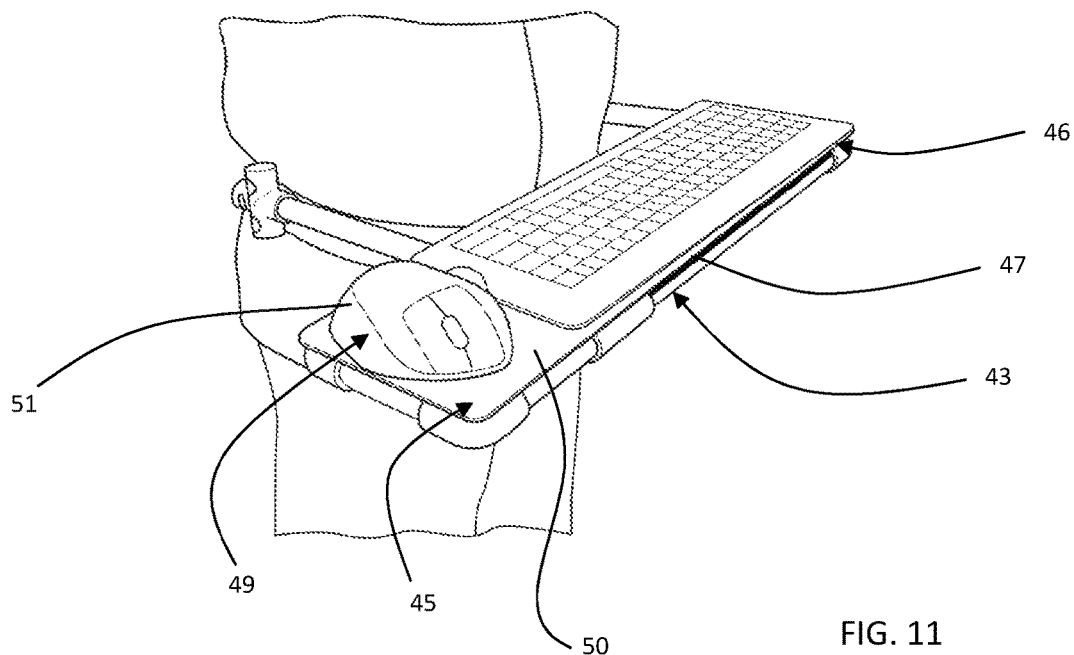
FIG. 11 is a front perspective view of an electronic device support system mounted anterior to a user.
Figure 12:
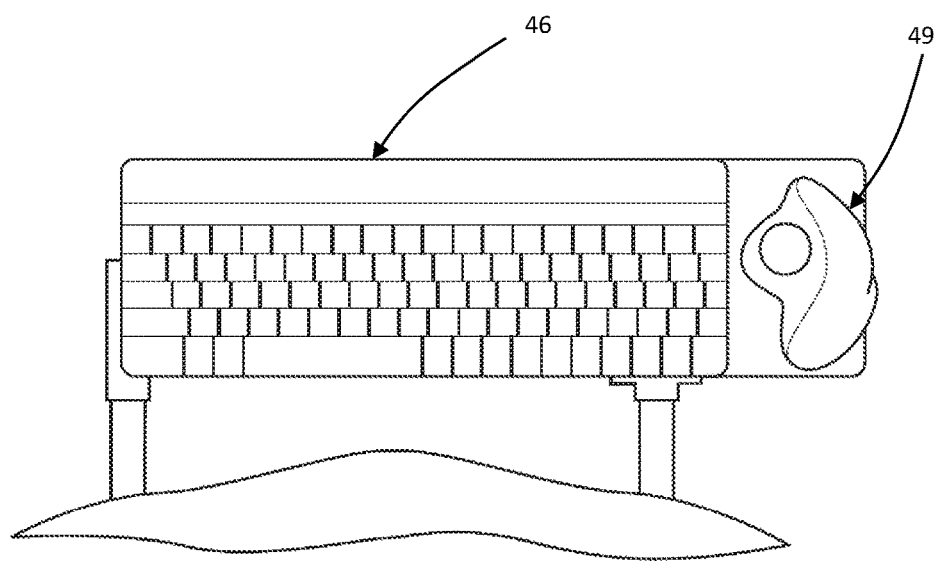
FIG. 12 is a top perspective view of an electronic device support system mounted anterior to a user.
Figure 13:
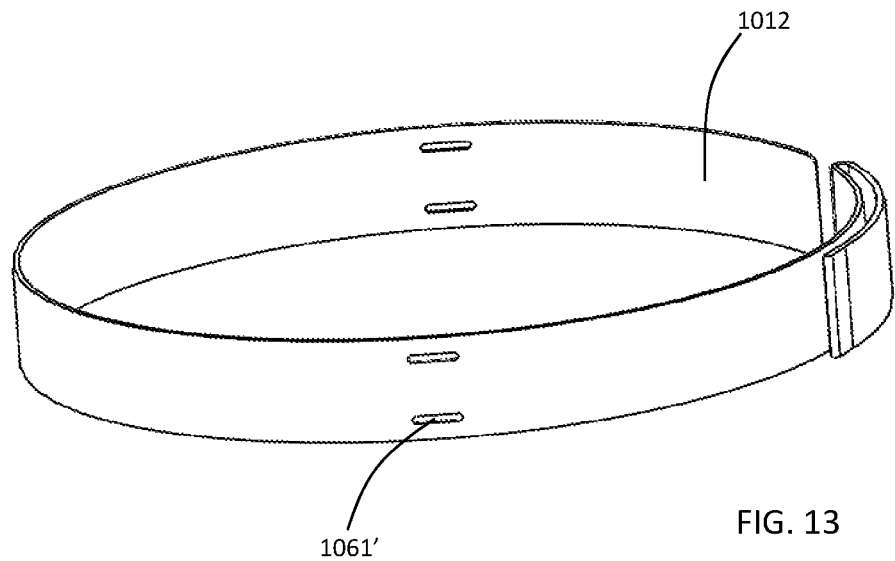
FIG. 13 is a side perspective view of a belt illustrating one form of slot for adjustable positioning of a base.

As illustrated in FIG. 11-12, a keyboard 46 is affixed to the support platform 43. In this embodiment, Velcro 47 is utilized between the bottom of the keyboard and portions of the top 48 of the support platform as a method for easy attachment and removal from the support platform. Similarly the mouse 49 is affixed to the superior face 50 of the device coupler 45 using Velcro 47 therebetween. There are many other alternatives for releasably connecting electronic devices to the support platform or other support surface described in this disclosure. For example, opposing magnets may be used on the opposing surfaces of a computer keyboard bottom and support platform. The keyboard is self-aligned and secured in place when the keyboard is placed near the opposing support surface due to the attraction of the magnets. The keyboard is later removed by overcoming the magnetic force holding the magnets together. In alternative embodiments, the electronic device may be housed within a form of device coupler in the form of a cover, skirt, or case designed to hold the device to the support system. In the before mentioned alternative embodiments, the projector or support platform may be configured to hold the cover or case rather than directly holding the electronic device.

In preferred embodiments, the waist mount is situated above or over the iliac crests of the user's pelvis. The iliac crests are broad strong bones well suited for carrying loads transmitted from the waist mount. The crests are not ideally shaped for resisting torsional motion. The pubic symphysis is spaced anterior and inferior to the iliac crests and is generally situated several inches below the belly button. In some forms, the support system may be configured with one or more support struts extending between the projector or support platform and the area of the pubic symphysis to assist in comfortably resisting torsional forces transmitted through the support system. This orientation of the strut will not obstruct any of the normal motions of the user's lower extremities.

The electronic devices supported by support system 10 are best utilized when positioned a predetermined distance from the user's body. This distance is generally driven by the length of a user's forearms so the user's hands are positioned over the controls of the supported electronic device when the user's upper arm near vertical. The actual distance between the abdomen and the keyboard may be decreased for a more rotund user due to body mass. For this reason, the projector length may vary or be adjustable to compensate for various distances from the body that work best for the user. For users with minimal tissue anterior of the rib cage, a typical spacing between the user's body and front of the keyboard is 1.0 to 7.0 inches and is dependent on user preference. In some embodiments, this distance is adjustable wherein the user is able to adjust the support platform closer or further from the base. On approach to adjust for this distance is to provide the user with the option to choose a projector length of their choice. Another approach is to utilize projectors that are telescoping (a tube within a tube) and therefore instantly adjustable in length. This approach provides opportunities for quick storage of the device by compressing the telescoping projector to a smaller storage configuration.

Figure 1:
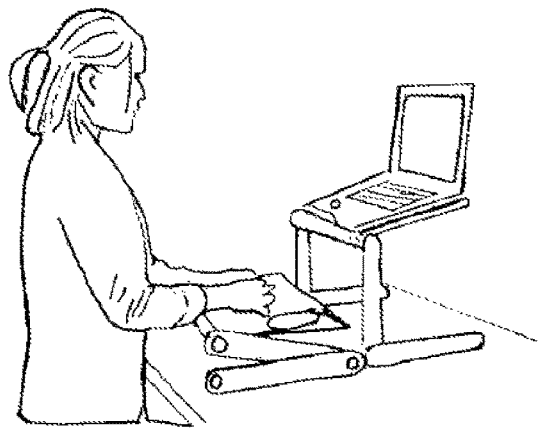
FIG. 1 is a perspective view of a desktop booster of the prior art.
Figure 2:
FIG. 2 is an perspective view of another desktop booster of the prior art.
Figure 3A:
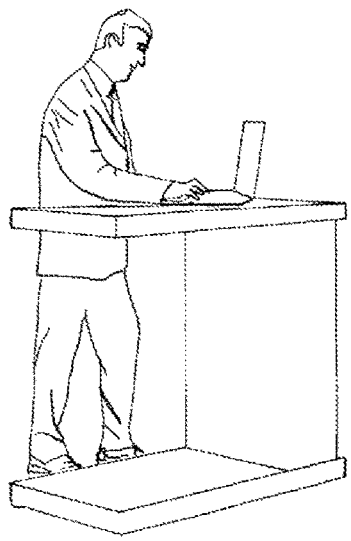
FIG. 3A is a perspective view of a standing desk of the prior art.
Figure 5:
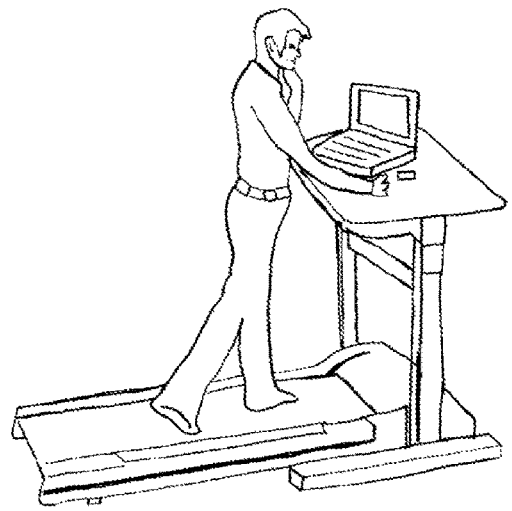
FIG. 5 is a perspective view of a treadmill desk.
Figure 6A:
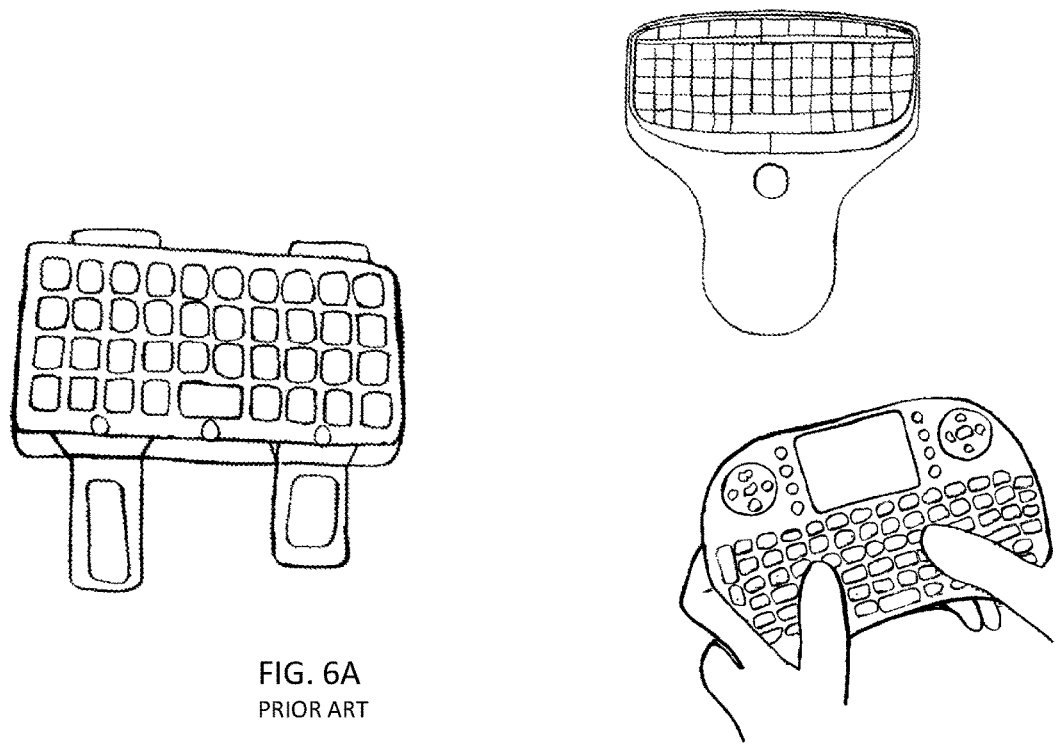
FIG. 6A are perspective views of hand held and wrist mounted computer input devices of the prior art.
Figure 6G:
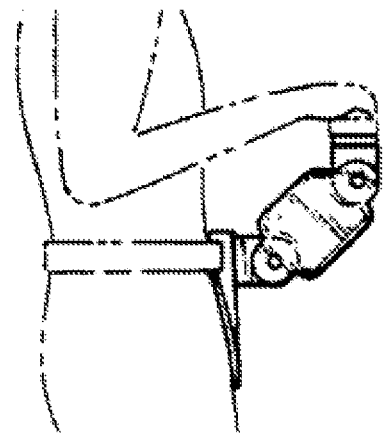
FIG. 6G illustrates an example of a prior art device.
Figure 6H:
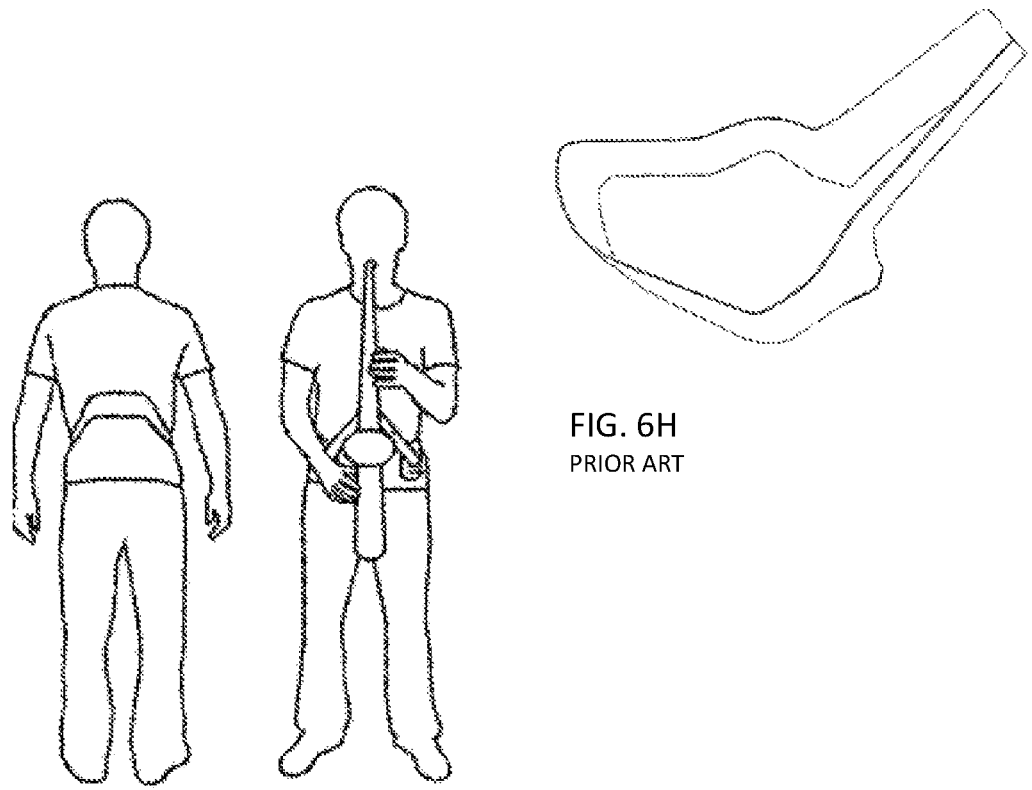
FIG. 6H illustrates an example of a prior art device.

In the embodiment illustrated in FIG. 8-12, the supported electronic device is a trackball mouse. A trackball mouse is preferred over a gliding mouse although a variety of different styles of computer mice may be used. Gliding mice are more sensitive to movements occurring other places in the body. Use of a gliding mouse during ambulation can cause the mouse to make unintentional gliding movements therein making the computer screen cursor more challenging for the user to control. With the trackball mouse 49 secured in place to the top of the extended support platform 44, the user's palm is stabilized on the body of the mouse 51 and the cursor movements are more easily controlled by movements of the fingers and thumb despite motion into the upper extremity transmitted from lower extremity movements such as ambulation. In other embodiments, a keyboard may be chosen with integrated touchpad mouse or trackball for controlling the cursor and selecting onscreen options as illustrated in FIG. 6C. Some keyboards may include features such as touch scrolling and are Bluetooth or WIFI enabled. In some embodiments, the keyboard may be downsized to include only the essential keys by eliminating the numeric keyboard. Some users may prefer more mobile keyboards that are light and have a smaller footprint such as the Microsoft Wedge Mobile Keyboard.

The position of a computer keyboard on the support system may be fixed or adjustable. For example, some users prefer the space between the G and H key on the keyboard to be aligned with the bridge of their nose. Other users may prefer to have the keyboard offset wherein the space between the G and H key is misaligned with the nose bridge. Alternatively, the projector in some embodiments is adjustable. For example, the projector may be adjusted so that the supported electronic devices are horizontal, or tilted upwards towards the user's head or downwards. Other adjustments may include the ability to move the devices towards the user's body or away, or side to side.

The disclosed support system can also function to support many other electronic devices besides computer keyboards and mice. In many forms, the same support system may be used to quickly interchange from a device such as a keyboard to control a remote computer, and then used to support a tablet style computer. For example, FIG. 11-12 illustrates one form of the support system supporting a keyboard and mouse. The keyboard and mouse may be removed and replaced with a tablet style computing device mounted to the support system. For example, the tablet device may be a Kindle Fire HD tablet secured to the support system 10 using the same Velcro strips 47 on the support system used to secure the keyboard 46 shown in FIG. 11. The keyboard 46 is removed from the support system by peeling it away from the Velcro and replacing it with the tablet device. Many tablets have a touch screen so no accessory keyboard or mouse is necessary. The position of the tablet may be adjusted to provide more tilt to the screen or adjustment along other planes by integrating positional props. Other types of releasable attachments between the support system and electronic device may be used besides Velcro such as retaining clips, magnets, elastic bands, or snaps.

In an alternative embodiment, the tablet 154 may include a keyboard. For example, the Microsoft Surface brand tablets include a pressure sensitive keyboard 156 that also serves as a tablet cover when the tablet is not in use. This support system may also be utilized for the support of laptop computers.

Figure 21A:
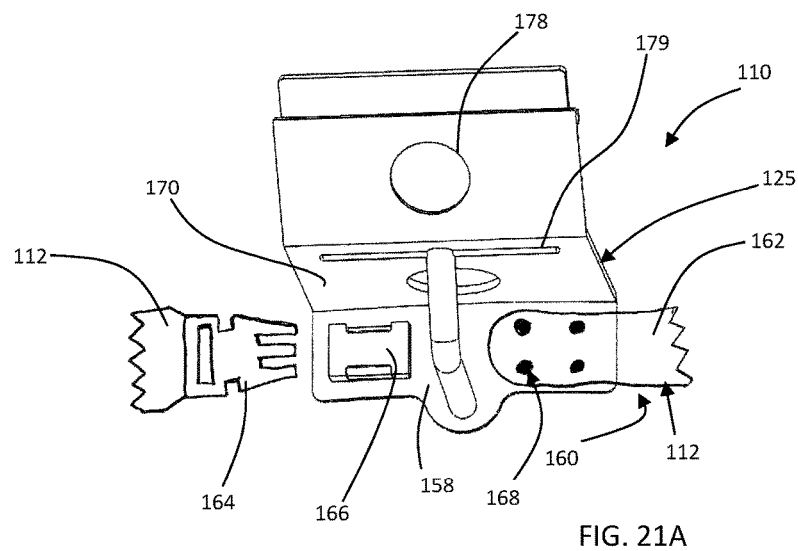
FIG. 21A is a distal perspective view of another form of the cantilevered portion of an electronic device support system secured by a waist mount in the form of a belt.
Figure 21B:
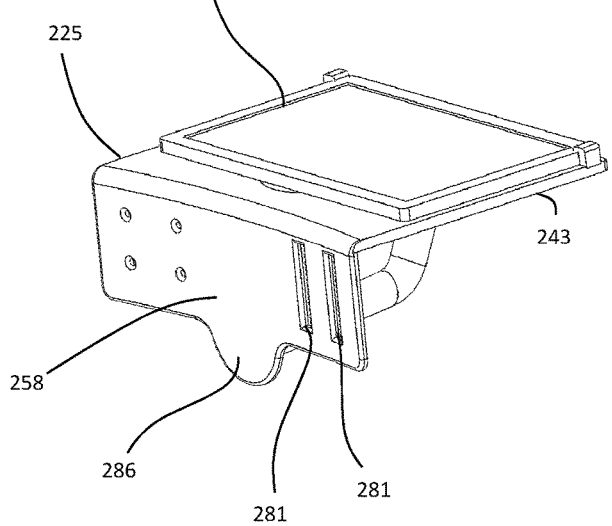
FIG. 21B is a proximal perspective view of another form of a cantilevered portion of an electronic device support system with integrated belt slots.
Figure 21C:
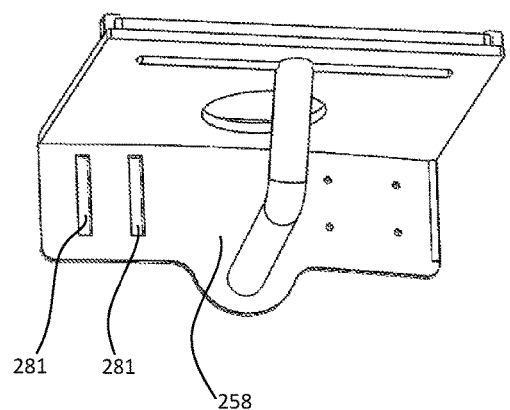
FIG. 21C is a distal perspective view of the electronic device support system of 21B.

As illustrated in FIGS. 21A and 21G (without belt), an alternative form of the support system 110 is configured to support both the keyboard 156 and tablet 154 style devices. The support system in this embodiment again comprises a projector 125 extending from a vertical belt wall 158 portion to be secured to a waist mount commonly in the form of a belt 112 as previously illustrated. One end of the belt 112 is secured to either the inside belt wall 160 or outside belt wall 162. For example, the belt may be secured to the belt wall by belt fasteners 168 positioned through holes aligned through the belt 112 and vertical belt wall 158 that clamp the belt wall and belt 112 end together. Secured at the opposing end of the belt is a closer in the form of a male end of a slide release buckle 164 as seen previously in FIG. 7. Secured to the opposite belt wall is a closer portion in the form of a female slide release buckle 166.

A support platform 170 extends from the projector portion 125 for supporting of an electronic device such as a computer keyboard. The support platform 170 is angled to support the keyboard 156 in a standard horizontal or mild tilt position. Projecting from the distal end of support platform 170 is a secondary support platform 172 for supporting an electronic device such as a tablet or in this illustration the computing tablet portion of a Microsoft Surface. Stabilizing the support platform 170 is a stabilizer 174 illustrated here in the form of a bar extending from the lower portion of belt wall 158 to support platform 170. The stabilizer 174 may take other forms such as a rib or strut. In some embodiments where the support platform 170 does not require support of a stabilizer, a handle (not shown) may extend from the bottom of support platform 170 without attachment to the belt wall for grasping by the user (not shown). In FIG. 21G, the user may use the stabilizer 174 as a handle to hold the support system 110 and electronic components with one hand while with the opposing hand wrapping the belt around their waist and engage the male end of the closer 164 in the female end 166 of the closer. Once the support system 110 and electronic devices are secured about the user's waist, the stabilizer 174 may be released and the user may begin using the electronic devices. To remove the system, the user grasps to secure the stabilizer 174 and squeezes the deflectable arms on the male end of the slide release buckle therein causing it to release. As illustrated in FIG. 21G, one or more retainers 176 may be used to secure the electronic device to the support system. Apertures 178, depressions or other features may be used to reduce weight of the support system in areas where support is not unnecessary. On the other hand, reinforcements 179 such as ribs may be used to reinforce areas where additional support is necessary.

In alternative embodiments, the secondary device platform 172 is removable or absent when a secondary support surface is unnecessary. This form is preferred for example, when the support system is utilized for support of a wireless keyboard or a touch screen tablet. The secondary device platform 172 is absent in the embodiment illustrated in FIG. 21B, 21C, 21D, 21F. The embodiment in 21B and 21C illustrates yet another alternative of a support system. A tablet computer 254 is illustrated on support platform 243. Although similar to the embodiment illustrated in FIG. 21A, this embodiment comprises looping belt lock. As illustrated in the lower left of FIG. 7, a belt may be configured to have opposing sides of Velcro adhered to a belt surface such that when the belt is fed through a loop or a ring, belt slack is removed and folded over upon itself. Similarly, the anterior face of the belt wall 258 comprises one or a pair of spaced belt slots 281. As illustrated before in FIG. 21A, one end of the belt (not shown) is secured to the belt wall 258. The free end of the belt is fed through one or more of the belt slots 281, tightened, then folded over on itself. As an alternative to the spaced vertical slots, an elongated ring may be fastened to the anterior face of the vertical belt wall 258. In this alternative, the free end of the belt is fed through the elongated ring, tightened, and again secured by folding over on itself.

FIGS. 21E and 21F illustrates an example of a support system configured for quick release from a waist mount. For example, a waist mount in the form of a supportive belt 312 is worn about the user's waist. Projecting from the outer belt wall 362 are one or more base preferably in the form of a hook 380 or bulb. The hook 380 extends through the arm window 382 located in the vertical belt wall 358 wherein the support system hangs from one or more hooks 80. The inferior portion of the vertical belt wall 358 may also be secured with a base or may simply rest against the abdomen of the user. A buckle window 384 may be included in the vertical belt wall 358 to eliminate interference between a belt buckle and the vertical belt wall 358 of the projector. The vertical belt wall in each of these embodiments may include a pubic ear 386 serving to prevent downward angulation of the device wall and to distribute forces across the pubic symphysis.

FIGS. 20A-20G illustrates yet another embodiment of a projector for use within the disclosed electronic device support system. The projector 425 in this embodiment is in the form of a bar or tube 441 formed to create a primary support platform for an electronic device. Here the bar or tube 441 is generally a U-shape although it could assume many other configurations. The projector 425 portion comprises an elongate support strut 439 serving to keep the U-portion propped at a desired angle to the user's body and reduce motion during use. At the ends of the elongate support strut are elongate anchors in this embodiment in the form of an enlarged sphere 488. The support strut 439 may be pivotally connected to support platform 443 to fold in the same plane as the projectors when not in use.

Figure 20A:
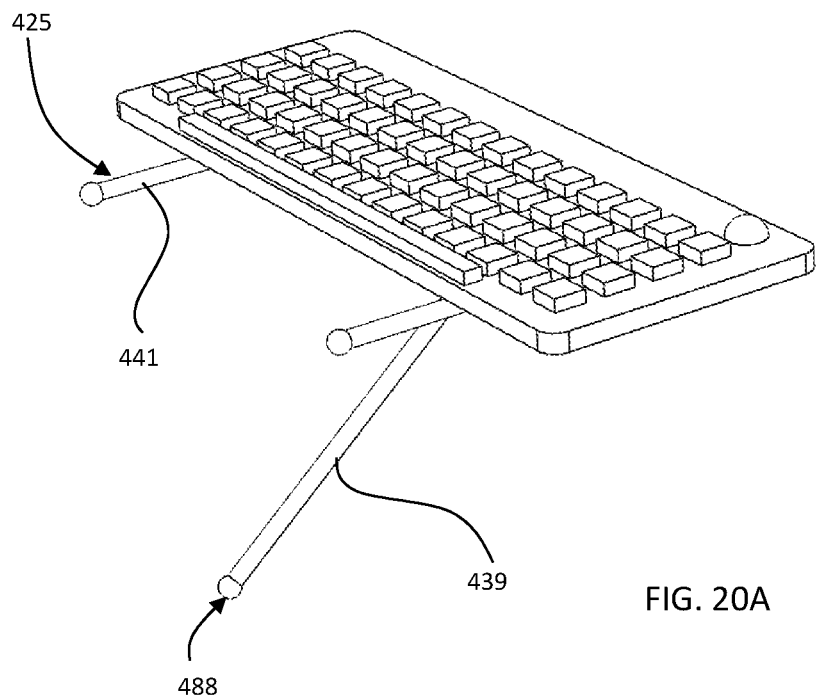
FIG. 20A is a side perspective view of one form of a projector and support platform supporting a keyboard and utilizing a secondary support strut to assist with control of tilt angle of the electronic device.
Figure 20B:
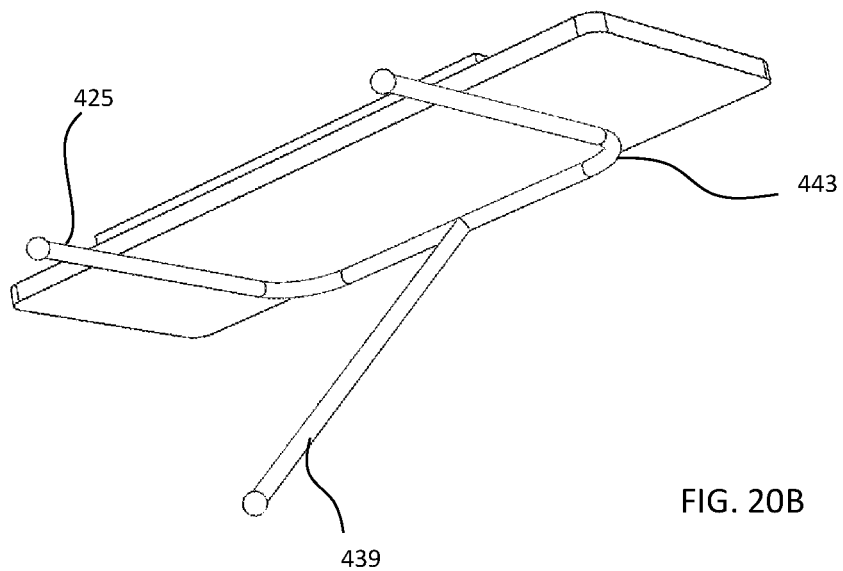
FIG. 20B is a bottom perspective view of a form of projector and support platform illustrated in FIG. 20A.
Figure 20C:
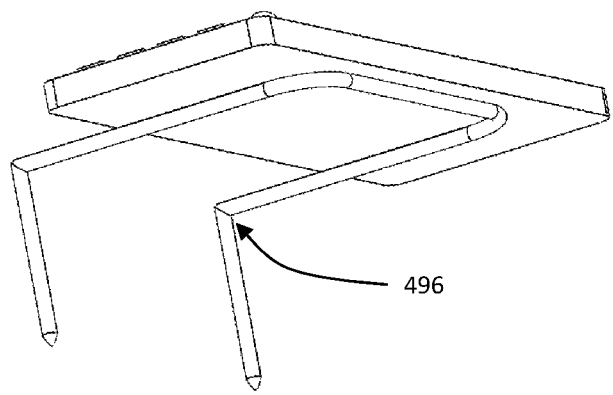
FIG. 20C is a bottom perspective view of a form of projector and support platform comprising a generally L-shaped projector end.
Figure 20D:
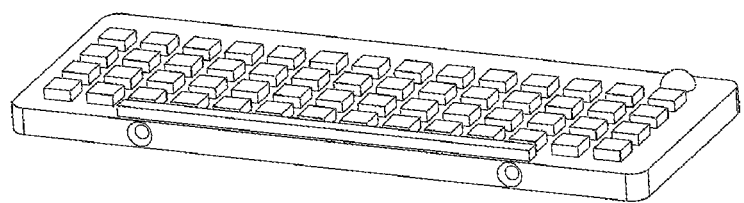
FIG. 20D is a front perspective view of a keyboard modified with recesses for integrating projectors and support platform within the device.
Figure 20E:
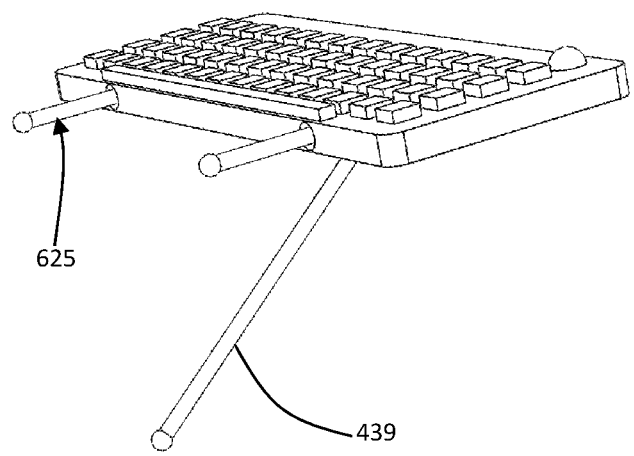
FIG. 20E is a side perspective view of a keyboard with integrated projectors and support platform.
Figure 20F:
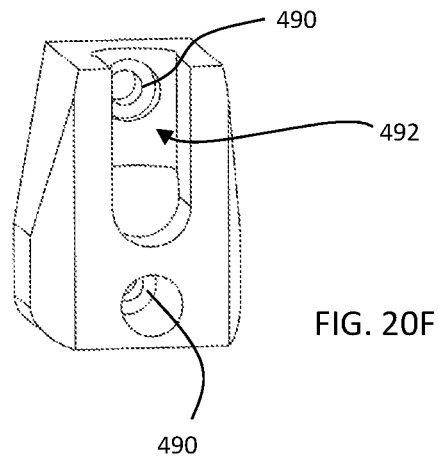
FIG. 20F is a front perspective view of one form of a capture block for securing to a waist mount.
Figure 20G:
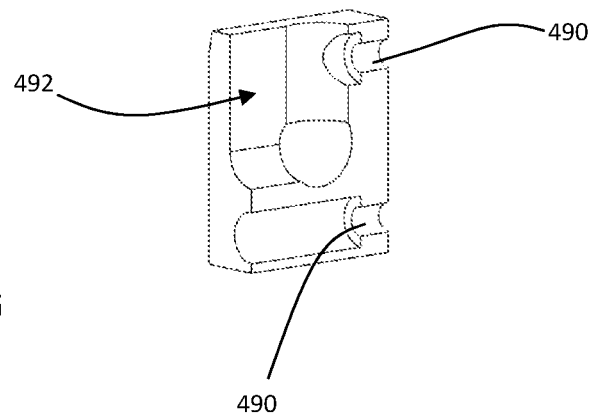
FIG. 20G is sectional view of the capture block illustrated in FIG. 20F.

Secured to the waist mount which in this embodiment is in the form of a belt (not shown) is a capture block configured for securing the sphere 488 of the elongate member therein. One form of a capture block is illustrated in FIG. 20F with a cross sectional view in 20G. The capture block comprises one or more anchor holes 490 for capturing a fastener to secure the capture block to the outer surface of a belt. The anchor holes 490 may be threaded wherein the fastener may be pushed through from the inside belt wall and threaded into the capture block anchor hole 490. Extending from an outer surface of the capture block is a pocket channel 492 configured in size and shape to pass the projector portion and elongate anchor, namely bar 441 and sphere 488. In some forms, the pocket channel 492 may be sufficiently undersized to require elastic deformation of the block when inserting or removing the elongate anchor therein preventing unwanted escape of the anchor from the capture block. The user overcomes this deformation resistance through the use of minor hand force to engage and disengage the elongate anchor from the capture block. The capture block and elongate anchor may take many forms. For example, instead of a pocket style capture, a dovetail interlock would serve similarly.

Figure 19A:
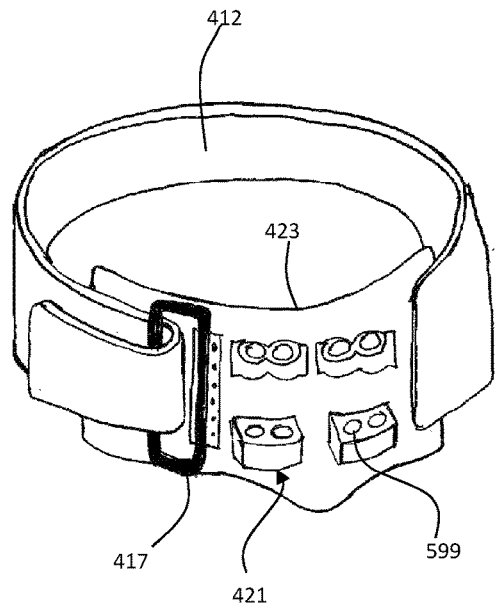
FIG. 19A is a front perspective view of one form of a waist mount comprising one form of a capture block for securing a generally L-shaped projector.

In other forms an elongate support strut 439 is absent. For example, in FIG. 20H, the proximal projector ends are in the form of bifurcated bars 494 in order to offer the support required to secure the keyboard in a generally horizontal or tipped from horizontal position. As a further alternative, the end of the projectors may be generally L-shaped 496 as illustrated in FIG. 20C. The L-shaped ends of the projectors are releasably captured in one or more complementing base in the form of capture blocks 421, or other pockets formed within the belt 412 or an abdominal plate 423. One embodiment of the capture blocks is illustrated in FIG. 19A. The capture block defines a capture wall 433 for surrounding a generally vertical portion of L-shaped 496 to secure it to the user's body.

Figure 19B:
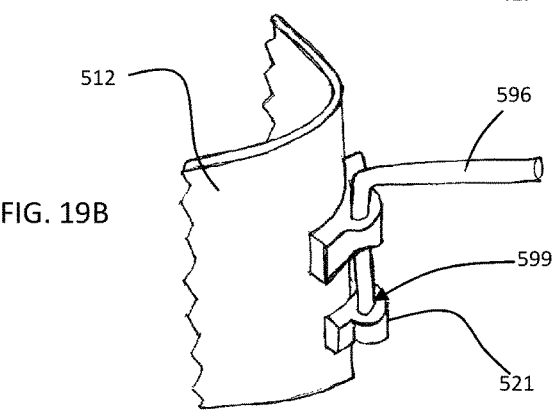
FIG. 19B is a partial side perspective view of one form of a projector held in a capture block secured to a belt.
Figure 19C:
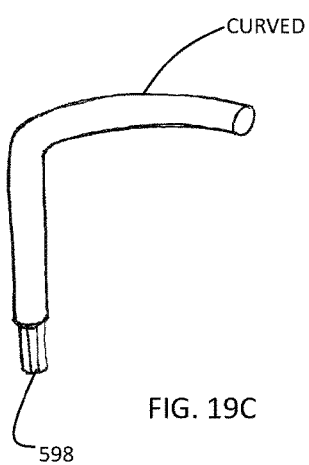
FIG. 19C is a side perspective view of one form of generally L-shaped projector comprising a curved distal portion for folding against a convex surface of a belt.

In another embodiment, the projector and support platform is not formed as a continuous loop as those illustrated earlier. As illustrated in FIG. 19B, the elongate projector support member is in the form of a generally L-shaped bar 596. Here a plurality of spaced bars 596 are utilized as projectors and support platform. The distal portion of the bar extends generally horizontal or tilted from horizontal to offer support to the electronic devices. The proximal portion of the body of bar 596 is releasably captured in complementing capture blocks 521 or other pockets formed within the belt or abdominal plate. The proximal portion of the bar may include a locking surface 598, non-circular for locking within a complementary non-circular corridor 599 in the capture block or belt (not shown) to control pivoting motion. This relationship secures the distal portion of the body in a predetermined direction in an operational configuration. To move to a storage configuration, the supported electronic devices are removed off the top of the distal support platform portion of the bar then the L-shaped body of the elongate support is lifted until the non-circular locking surfaces 598 are disengaged. The distal portion of the body is rotated then folded against the belt and lowered to be relocked in a storage configuration. With the elongate supports stored out of the way, the user can continue to wear the support system without obstruction from any of its parts. To improve fit against the body, the distal portion of the L-shaped body may be curved in a horizontal plane to a radius similar to the human abdomen as illustrated in FIG. 19C.

Figure 19D:
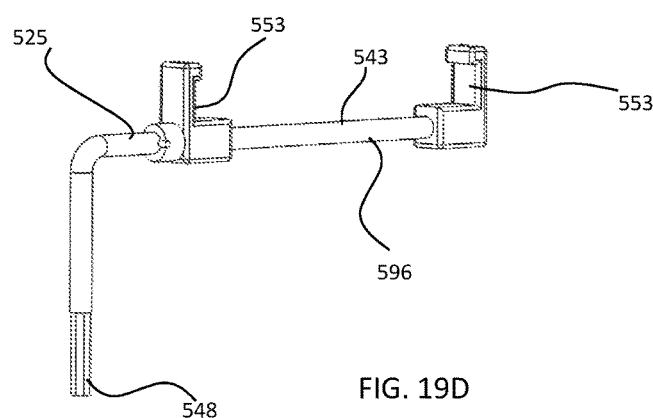
FIG. 19D is a side perspective view of one form of a projector comprising capture fangs for holding an electronic device.

The distal portion of the L-shaped bar 596 may include one or more capture fangs 553 to releasable hold the electronic device on the support system as illustrated in FIG. 19D. Here, the distal capture fang is fixed on the bar 596 whereas the proximal capture fang is biased toward the distal capture fang by spring 555 and spring retainer spring block 557. This configuration provides quick insertion and removal of electronic devices such as a wireless keyboard by pushing one edge of the keyboard against the fang 53 against the biasing force then lowering the opposing edge of the keyboard in front of the fixed fang. The keyboard is released and captured between the two capture fangs on each L-shaped bar.

Figure 20H:
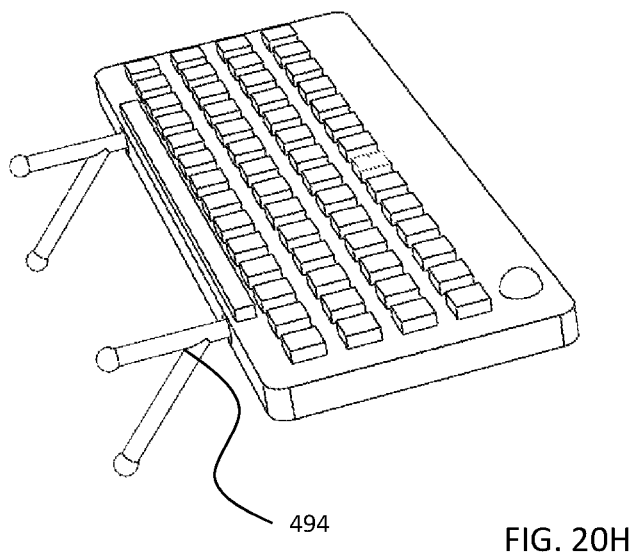
FIG. 20H is a top perspective view of keyboard with integrated bifurcated projectors.

As an alternative, the projector may be at least partially integrated into the body of the electronic device. For example, FIG. 20E illustrates one form of a projector 625 with support platform housed within a computer keyboard body. The projector may include an operational and non-operational configuration. In the non-operational configuration, the projector may be removed, unaltered, or stored within the electronic device. In one form, the projector my telescope in and out. In FIG. 20H, each projector may be rotated 90 degrees then pushed forward so as to slide within a cavity on the underside or front surface of the keyboard (not shown). This is another method that the keyboard may transition from being secured to a waist mount for mobile use to being placed on a table for stationary use. FIG. 20D illustrates a computer keyboard modified with recesses for integrating the projector within the device.

The belt of the support system may comprise various combinations of materials to provide a suitable combination of belt flexibility, rigidity, strength, and force distribution. For example, as illustrated in FIG. 19A, the outer ring of the belt is manufactured from a strong nylon mesh that is padded. One end of the outer ring is secured to a molded 423 abdominal plate. The abdominal plate 423 is made from a molded plastic providing an increased rigidity over the nylon mesh and is better equipped to handle the loading forces that will be imparted on the capture block 421. The abdominal facing side of the abdominal plate may be padded for user comfort. On the opposing end of the abdominal plate is a closer 417 in the form of a ring secured to the abdominal plate. The free end of the belt 412 loops through the ring, is pulled until tightened, and folded on itself for Velcro style locking. The capture blocks here are in an upper and lower half as shown in FIG. 19B.

Early prototypes of one embodiment of a electronic device support system have been illustrated in FIGS. 8-12. Improvements continue to be made to this system resulting in several additional embodiments. For example, FIGS. 15A through 18B illustrate alternative projector and base embodiments configured for instantaneous coupling and uncoupling of one or more projectors with a base. (It should be noted that in alternative forms the instantaneous coupling and uncoupling can occur between the projector and support platform rather than between the base and projector.) A cantilevered portion of the support system extends from a waist mount or base portion. In some forms, the cantilevered portion is generally aligned in a single plane 'A' (FIG. 23A) and is removable from the base or waist mount portions. This feature is included for example in the embodiments illustrated in FIGS. 15A, 20A and 20E (with support strut folded), 22A, 22H, 23A, 24A and in other Figures. In other forms, a proximal end of the cantilevered portion may include a support portion that extends obliquely out of the generally single plane. For example, as illustrated in FIG. 21D, the cantilevered portion includes a belt wall 358 obliquely extending from the remaining generally uniplanar cantilevered portion. A further example of this is illustrated in FIG. 20C with the downwardly extending legs. In some forms the cantilevered portion may be formed unitary with the waist mount and thus generally inseparable from the waist mount. An example of this configuration is illustrated in FIG. 21A wherein one end of the belt 112 is fixed to belt wall 158 by belt fasteners 168.

Once the user secures the belt around their waist, the instantaneous capture and release provides the user the option to quickly attach and release the projector with electronic device secured in a single step. Standard anatomical positions such as 'lateral' and 'anterior' are used to describe positions of parts of the disclosed device in relation to the human body when mounted to the human body. In preferred embodiments, a projector is releasable from one or more positions on lateral portions of a waist mount or anterior portions on a waist mount. In all embodiments, a support platform is positioned anterior of a user for ergonomic use of the electronic device. As will be described later, the projector and electronic device and also the belt can then be stored on the user's desk or wall utilizing a small footprint such that little desk, wall or other space is utilized. One base 726 form is illustrated in FIGS. 17A and 17B. Base 726 comprises an anterior receiver 738 for capturing projector 725. The base 726 comprises an inner surface 729' for mounting against an outer wall of 714 of a belt. Access holes 730 are sized for containment of a fastener nut. Smaller diameter anchor holes 731 extend between the access hole 730 to inner surface 729'. An anterior receiver 738 is sized and shaped to releasably house the proximal end of projector 725 to support it in front of the user. The anterior receiver 738 defines a capture surface 738'. In preferred embodiments the anterior receiver 738 may be sloped to provide for ergonomic positioning of the electronic device. A lead 738" is an enlarged portion of the anterior receiver positioned to assist directing the projector 725 into anterior receiver 738.

FIGS. 15A, 15B and 16 illustrate projectors 725 and support platform 743 on which electronic devices are supported. In this embodiment, the distance between the projectors 725 is adjustable to accommodate to various widths at the user's waist. For example, at the middle of support platform 743 each rod end is configured with a linear slide joint 725' here in the form of a tongue and groove. FIG. 15B illustrates the tongue 725" portion. As a further alternative, support platform 743 is configured with a turnbuckle 725''' in FIG. 16. Rotation of the turnbuckle causes a change in distance between each projector 725. In preferred embodiments, each projector 725 curves inward toward a midline as they become part of the support platform 743. For users with larger waists, the projectors 725 will be spaced further apart and utilize a larger inward curvature as they extend to become a support platform 743. Likewise, users with smaller waists will utilize a smaller inward curvature.

Several other embodiments of bases are disclosed in FIGS. 17C through 17I. Base 826 (FIG. 17C, 17D) is configured to slide directly over a belt rather than a fastened to the side of a belt. For this reason the fastener access holes and anchor holes noted in other embodiments have been eliminated. Instead, the base 826 comprises a belt receiver 831 sized and shaped for containment of a belt member. The belt receiver defines a belt receiver surface 831'. Variations of this include the embodiment in 17E and 17F. The belt receiver 831 in these embodiments is open. The base in 17E can be wedged over the outside of the belt. Similarly, FIG. 17F also illustrates an open belt receiver with expanded openings. The belt is captured between an upper belt wall 831" and a lower belt wall 831'''. Since the weight of the projectors and keyboard produce a downward rotation on the base, the anteriorly placed upper belt wall 831" and posteriorly placed lower belt wall 831''' are all that is necessary to hold a position on the belt. The base in 17F is easily attached to the belt by rotating the base ~45 degrees, pressing against the belt, then de-rotating 45 degrees until the belt is fully enclosed with in the belt receiver 831 in FIG. 17F.

Other examples of configurations of the anterior receiver of the base are illustrated in FIGS. 17G, 17H, and 17I. The base in 17G comprises a lateral slot 838"'. In previous embodiments the proximal end of the projector is aligned with the longitudinal axis of the anterior receiver then the projector is inserted into the receiver. The lateral slot eliminates the need to align the projector and the anterior receiver. The user deflects the projector laterally along the lateral slot 838"' and releases it so that the projector springs into the lateral slot. Alignment between longitudinal axis of the anterior receiver and projector are no longer necessary. Removal of the projector is done by either pulling the projector in a distal direction or once again deflecting the projector out of the lateral slot then moving distal. Some embodiments of the base include positioners 838"' generally in the form of a boss or depression located within the lateral slot 838"' or the anterior receiver to assist the user in quickly positioning the projector at a position to provide a comfortable distance between the user's body and the supported electronic device.

The base embodiment illustrated in FIGS. 17I and 17H offers yet another means for instantaneous connection between the projectors and the base. The base embodiment here comprises a primary post 836 and a secondary post 836'. In this embodiment, the primary post 836 is located anterior and below anterior receiver 838 whereas the secondary post 836' is located posterior and above anterior receiver 838. Residing between the primary and secondary post is entry portal 838". This configuration also provides for instantaneous coupling between the projector and the base. Here the projector is positioned near vertical and the proximal end of the projector is lowered between the primary post 836 and secondary post 836'. The projector is then rotated forward until a proximal portion of the projector wedges against secondary surface 838''' of the secondary post 836' and a more distal portion of the projector wedges against primary surface 836". The projectors utilized in 17I may also be deflected lateral as a method of insertion as discussed for FIG. 17G. Removal of the projector from the base can be done by sliding the projector distally until removed from the anterior receiver 838 or laterally deflecting the projector out the side of the base or de-rotating the projector until nearly vertical and lifting until the projector is removed from the entry portal 838''''. The primary 836 and secondary posts 836' may assume other forms. For example, the post may be in the form of the body of a fastener or boss affixed or integrated into the side of a belt. Similarly the projector is wedged between the two spaced fastener bodies as described for FIG. 17I. As described with these many examples, the cantilevered portion of the device with perhaps the associated electronics mounted thereon may be coupled and uncoupled from the waist mount portion using quick or instantaneous release. In these preferred embodiments, the user grasps a part of the cantilevered portion such as the projector(s) and pulls or pushes overcoming friction to couple or uncouple it from the base or waist mount portion. With other embodiments described, the user releases the projector in a first step (i.e. deflects the projectors or tilts them up), while simultaneously or immediately following with a pushing or pulling action. In preferred embodiments, these actions may be completed while the user's hands remain on the projectors without the need to remove them for removal or unlocking nuts, screws, release pins, snaps, ties, or other restraining devices first.

Many other variations to provide instantaneous coupling and decoupling between the projector and belt are contemplated. For example, as a substitution to the base, an anterior receiver pocket (not shown) to house the projector may be formed in the side of the belt. The pocket may be formed by sewing of a patch over the belt or sewing two layers of a belt together and providing an opening to receive the proximal end of the projector. Coupling the projector with the belt involves sliding the proximal end of the projector into the open end of the pocket on the belt. Alternatively, one or more loops may be sewn on the belt and the projector is fed through the loops. In other embodiments a combination of these techniques may be used. For example, the projector may be first thread through a loop secured to the belt then rest against a fastener style post on the proximal end.

Figure 18A:
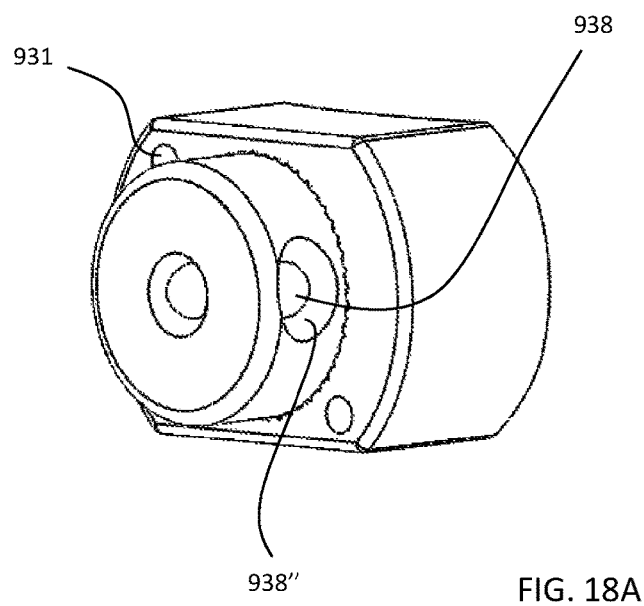
FIG. 18A is side perspective view of a base configured for tilting adjustment.
Figure 18B:
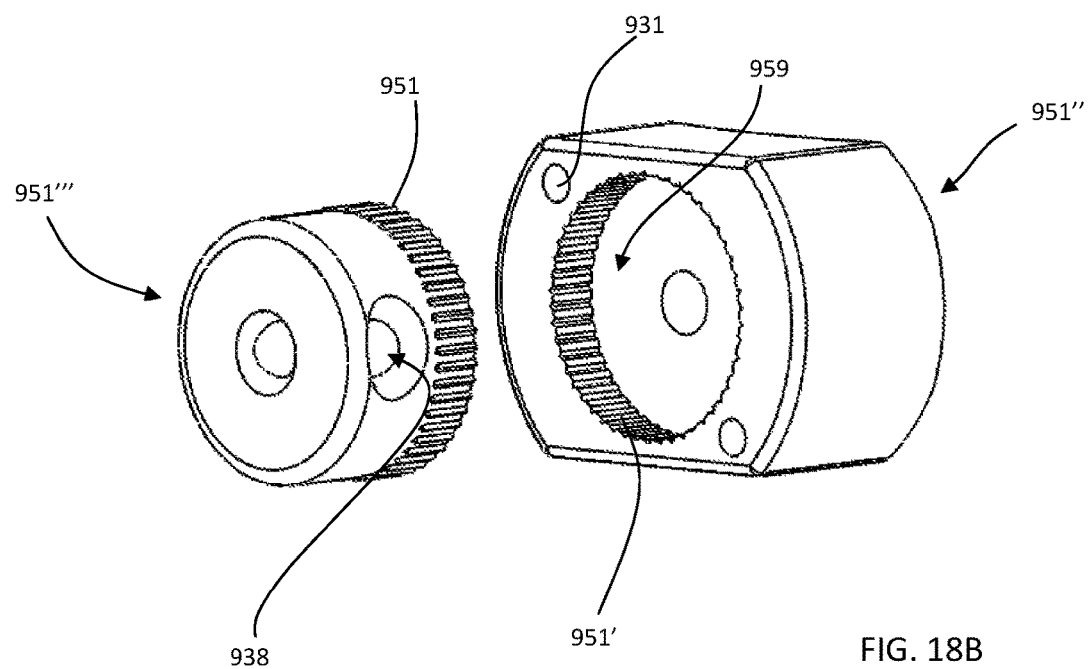
FIG. 18B is a side perspective exploded view of an inner and outer hub of the base illustrated in FIG. 18A.

The system may be configured to provide for rotational adjustment of the projectors so the user can instantly adjust the angulation of the electronic device with respect to their body. For example, such a system would provide for tilting adjustment of a keyboard supported by the support system. Illustrated in FIGS. 18A and 18B is a base comprising an outer hub 951''' and an inner hub 951''. The outer hub comprises an anterior receiver 938 and a primary spline 951. The inner hub 951'' comprises a complementary secondary spline 951' and anchor holes 931 for fastening the inner hub 951'' to the belt. In this embodiment the outer hub 951''' is elastically biased by a central spring (not shown) to hold outer hub 951''' within inner bowl 959. The rotational position between primary spline 951 and secondary spline 951' determines the angulation of anterior receiver 938 which in turn determines the angle of tilt of a projector enclosed therein. Angular adjustment of the projector is user created by application of a lateral force against the projector to overcome the spring bias and uncoupling the primary spline from the secondary spline to allow upward or downward adjustment of the projector. Once a desired position is located, the lateral force is released to allow the outer hub to reengage the inner hub thereby locking the projector in a new angulation. Alternatively, the outer hub may be affixed to the projector eliminating the need for a central spring to bias the outer hub and inner hub together. In one instantaneous step, the user deflects the projector arm out against the interal spring bias of the projectors. The user finds a predetermined projector angulation and releases the outer hub to spring back into the inner bowl. The primary and secondary splines maintain the rotational position of the projector thereby determining the angulation of the attached electronic devices with respect to the body.

Figure 14:
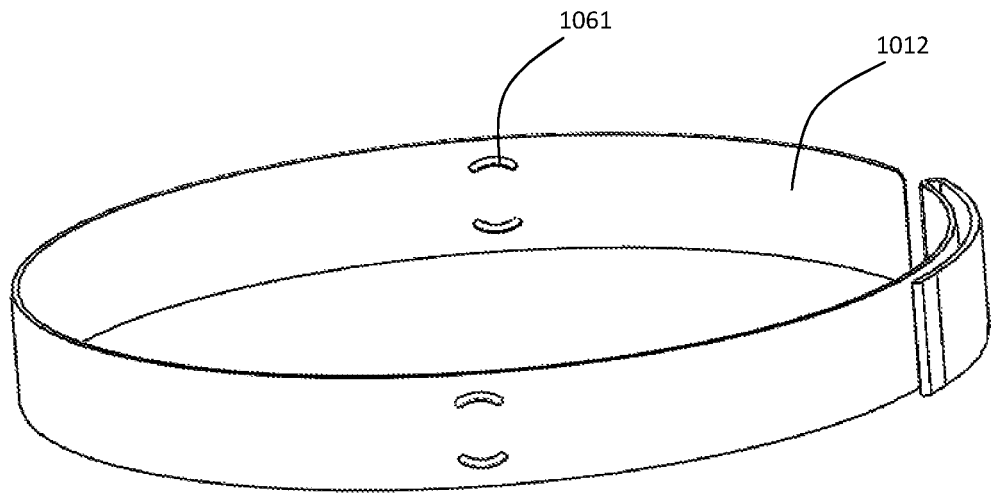
FIG. 14 is a side perspective view of a belt illustrating another form of slot for adjustable positioning of a base.

The rotational tilt of the base may be determined utilizing other methods. As illustrated in FIG. 14 for example, one or more rotational slots 1061 are formed within the belt 1012. A base 726 as illustrated in FIG. 15A is fastened by extending fasteners through the rotational slots 1061. A preferred angular position between the anterior receiver of the base and belt is determined then the fasteners are tightened to hold the base at the preferred angle of rotation. Similarly, linear slots 1061' may be cut through the wall of the belt to accommodate a variety of waist sizes. Again, fasteners through the base extend through the linear slots of the belt. The base is slid along the slot to obtain a preferred distance between each base. The fasteners are then tightened. The slots 1061' may be enlarged to provide for both linear and curvilinear adjustment. Likewise, fastening hole patterns through the belt may be repeated to provide multiple base adjustment options along the belt length.

Figure 22A:
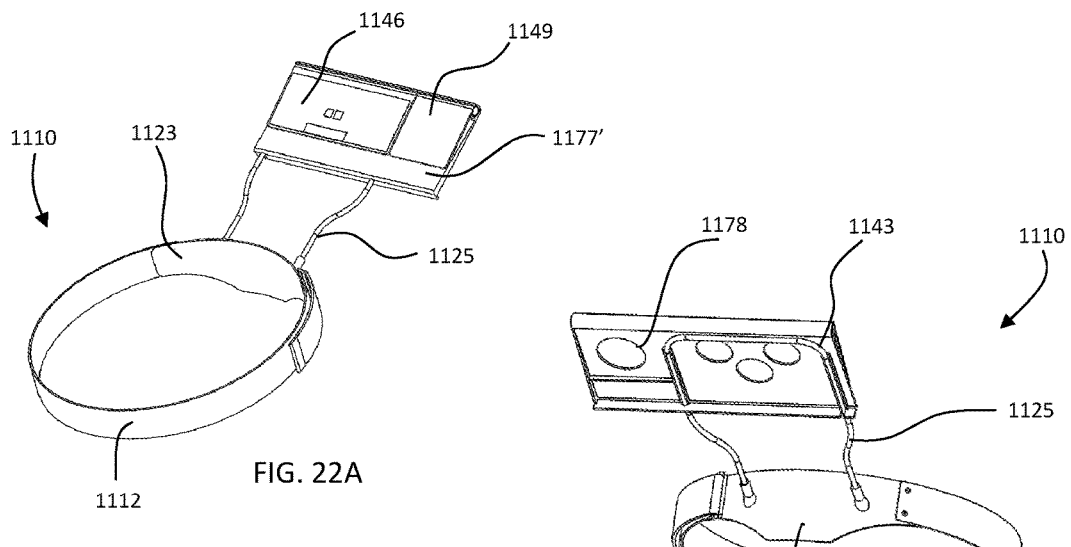
FIG. 22A is a top perspective view of another form of an electronic device support system.
Figure 22B:
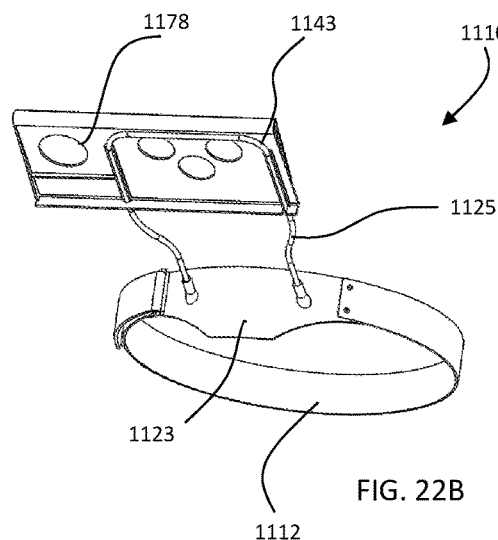
FIG. 22B is a bottom perspective view of the system in FIG. 22A.
Figure 22C:
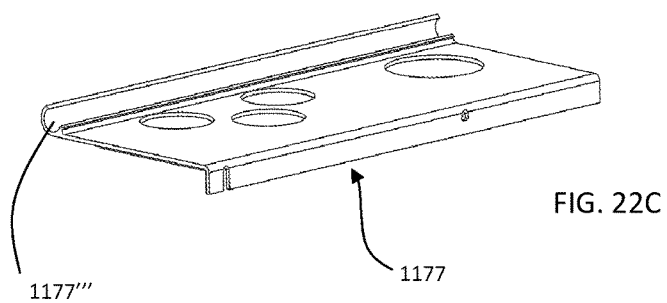
FIG. 22C is a top perspective view of one form of a device coupler.
Figure 22D:
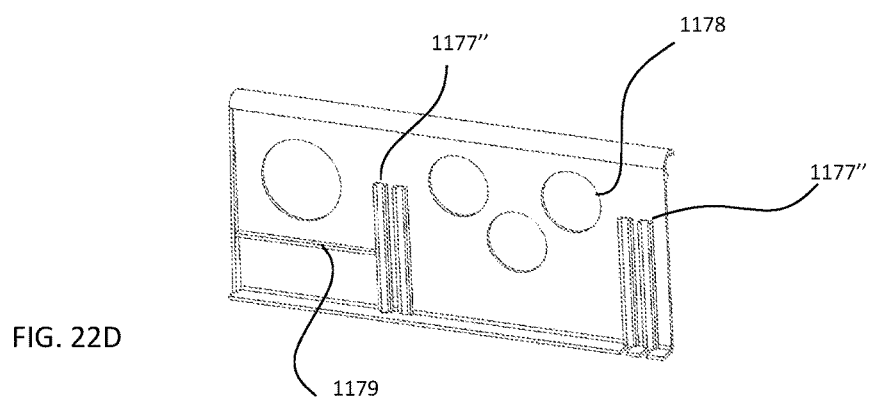
FIG. 22D is a bottom perspective view of one form of a device coupler.
Figure 22E:
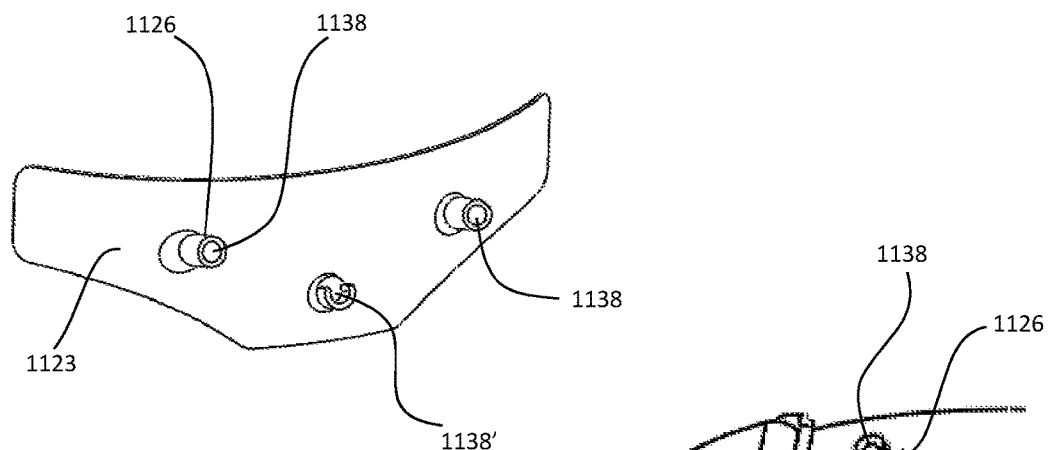
FIG. 22E is a front perspective view of one form of an abdominal plate.
Figure 22F:
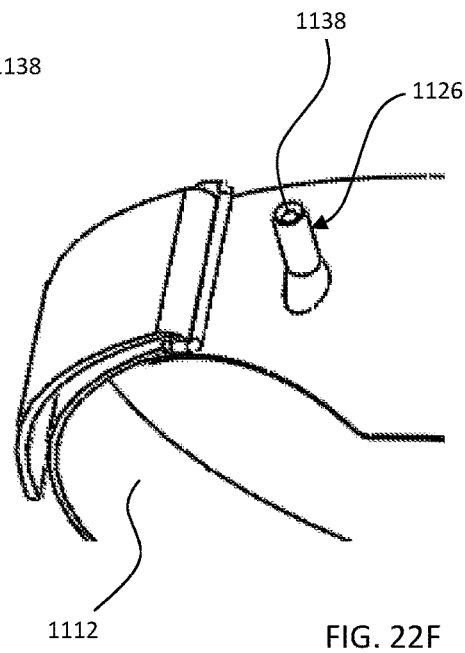
FIG. 22F is a bottom perspective view of one form of a belt and abdominal plate.
Figure 22G:
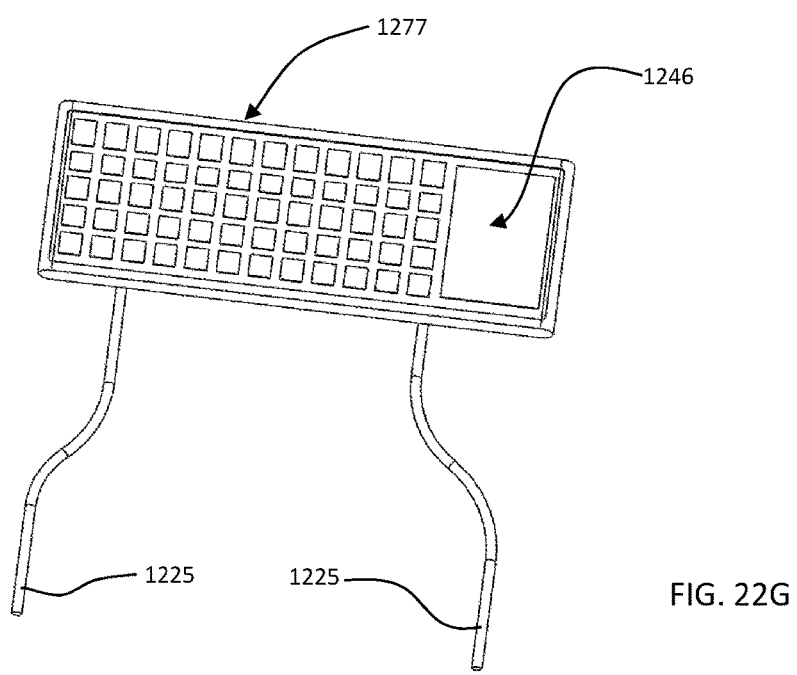
FIG. 22G is a top perspective view of one form of a cantilevered portion of an electronic device support system.
Figure 22H:
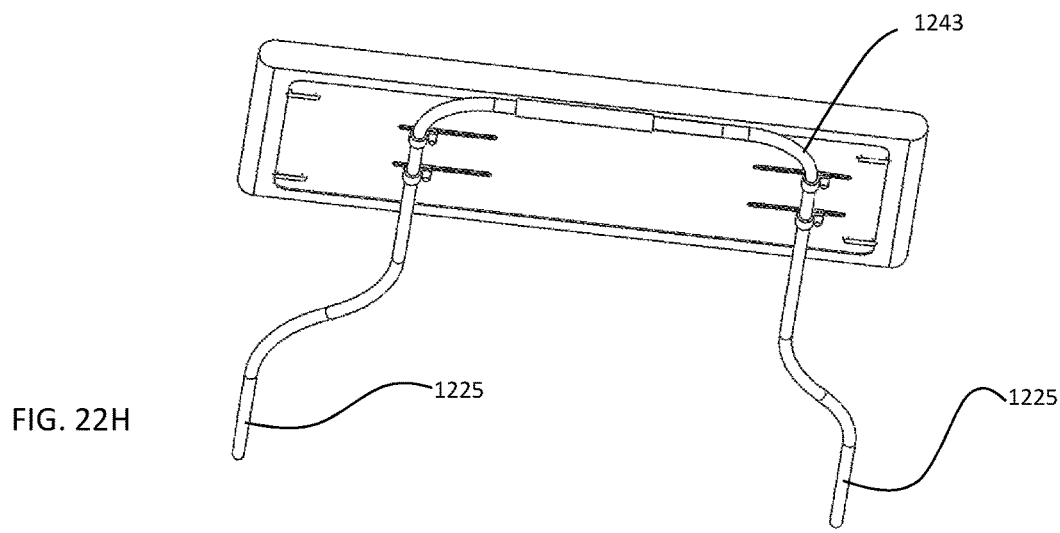
FIG. 22H is a bottom perspective view of the device in FIG. 22G.

Illustrated in FIGS. 22A-22F is yet another embodiment of an electronic device support system. The waist mount may assume many different configurations but here it is in the form of a belt 1112 fastened to an abdominal plate 1123 configured to flex to contour to the shape of the user's abdomen while maintaining adequate stiffness to counteract torsional forces transmitted through the projectors. Extending from the anterior plate 1123 is one or more base 1126. Defined within the base is an anterior receiver 1138 sized and shaped to releasably house the proximal end of a projector 1125. This relationship again provides for instantaneous coupling and uncoupling of the projectors with connected electronic devices from the base 1126. The projectors extend anteriorly to form a support platform 1143 on which a device coupler 1177 may be mounted. The device coupler 1177 illustrated in FIG. 22C is configured to capture a keyboard and touch mouse. Device coupler 1177 includes a portion extending proximally to form a wrist rest 1177' for resting of the user's wrists while utilizing the keyboard and mouse. On the bottom of the device coupler is one or more fixation couplers 1177'' in the form of snap retainers to secure the support platform 1143 to device coupler 1177. The support platform 1143 may be configured to have an adjustable width through the use for example of a turnbuckle as described previously. A multitude of snap retainer positions accommodates for this adjustment. Device coupler 1177 includes device retainer 1177''' here in the form of a snap channel. Here the snap channel is configured to secure the widened cylindrical end of an Apple wireless keyboard and magic trackpad as illustrated in FIG. 22A. Device coupler 1177 may include one or more reinforcements 1179 illustrated here in the form of a rib to reduce flex in the device coupler. The device coupler 1177 may comprise one or more apertures 1178 for the reduction of weight.

Figure 22I:
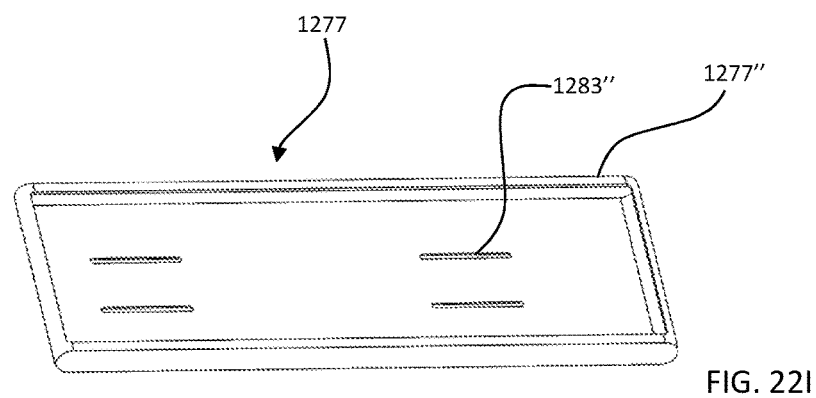
FIG. 22I is a top perspective view of one form of a device coupler.
Figure 22J:
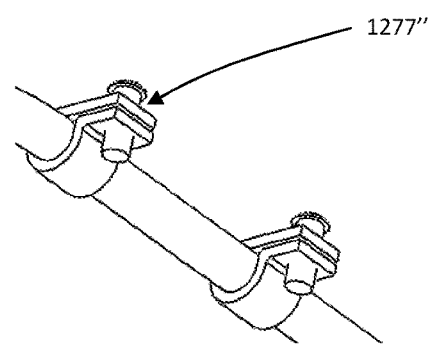
FIG. 22J is a bottom perspective view of one form of a fixation coupler.

FIG. 22G-22J illustrates an embodiment of an electronic device captured within a device coupler 1277 as illustrated in FIG. 22I. The device coupler comprises an elastic device retainer 1277''' configured to encircle and hold a keyboard 1246 equipped with integrated touch mouse. The elastic device retainer 1277''' includes a slotted bottom 1283'' for adjustment on support platform 1243 with respect to the position of the electronic device. Slots extending lateral provide for adjustment in the width of the projectors as may be needed to adjust to user size. Slots extending anterior-posterior provide another method for adjustment of the electronic device closer or further from the user's body. A variety of different fixation couplers 1277'' may be used to secure the support platform 1243 to the device coupler 1277. As illustrated in FIG. 22J, one or more fixation couplers 1277'' in the form of a clamp encircles a portion of support platform 1243. A fastener extending through the clamp extends through slotted bottom 1283'' and is tightened to secure the support platform 1243 to device coupler 1277. Numerous other forms of fixation couplers 1277'' available in the prior art may be used including spring pins, friction fits, threaded couplings, Velcro, clasps, adhesives, welding etc. The projectors may be configured to be releasable from the device coupler or configured to pivot or be repositioned so as to enable a smaller storage configuration.

Figure 23A:
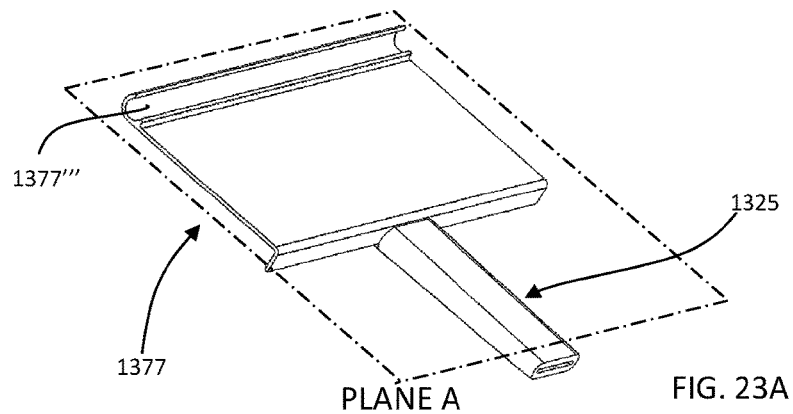
FIG. 23A is a top perspective view of one form of a cantilevered portion of an electronic device support system.
Figure 23B:
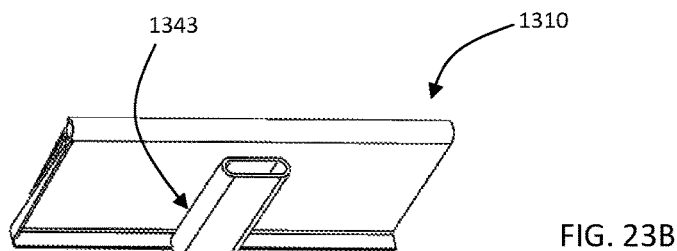
FIG. 23B is a bottom perspective view of one form of an electronic device support system (belt not shown).
Figure 23C:
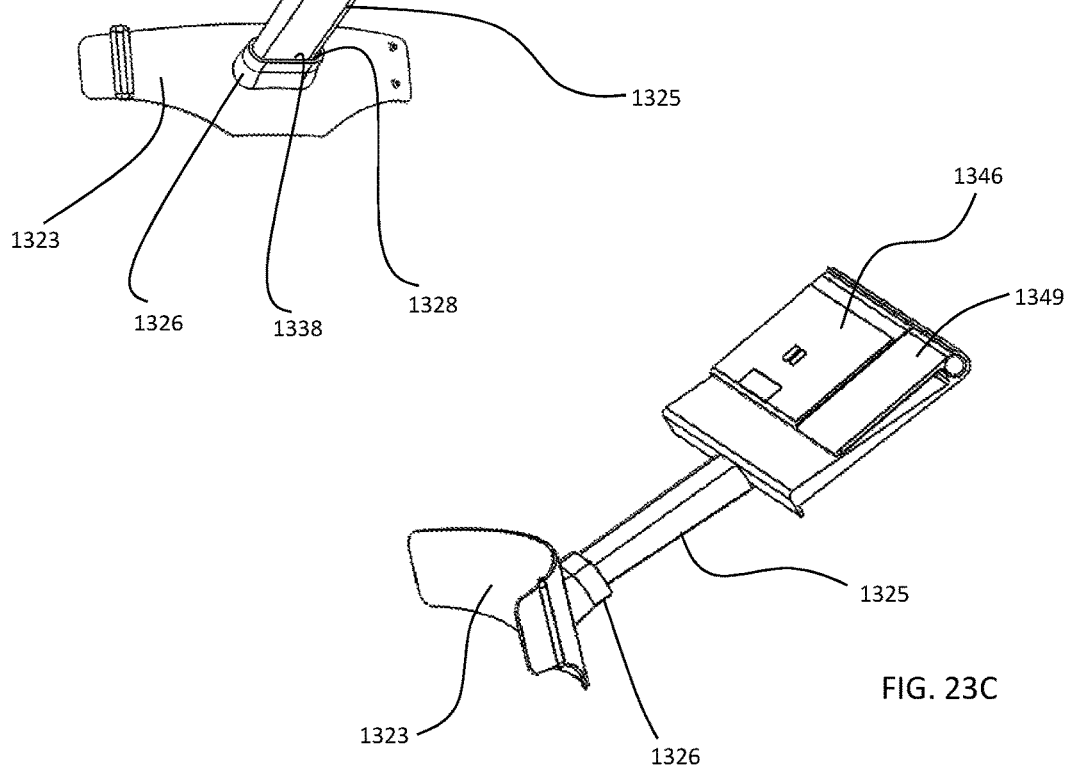
FIG. 23C is a side perspective view of the electronic device support system of FIG. 23B.

FIGS. 23A through 23C illustrate yet another form of electronic device support system 1310. This system comprises a single projector 1325 in the form of a tube. The proximal end of projector 1325 is received within base 1326 in this embodiment extending from abdominal plate 1323. Base 1326 is positioned anterior and further comprises a receiver 1338 defining inner surface 1328. Projector 1325 includes a support platform portion 1343 that is joined to device coupler 1377 by a fixation coupler 1377''. In this embodiment, the device coupler 1377 is in the form of a molded polymer wherein the projector 1325 and the support platform portion 1343 and device coupler 1377 are formed as a single molded polymer part. In other embodiments, these portions may be configured to be fit together as an assembly. This embodiment also offers instantaneous coupling and uncoupling of the projector 1325 from base 1326 as the projector 1325 resides in the anteriorly directed receiver 1338. The user couples and uncouples the projector 1325 from the receiver 1338 by grasping the projector 1325 and sliding the proximal end of the projector into or out of the receiver 1338. The torsional downward force and friction between the outside surface of the projector and inner surface 1328 of receiver 1338 retains the projector 1325 in position within the base 1326. In this embodiment the base 1326 extends from an abdominal plate 1323 connected to a belt (not shown). In alternative embodiments, the base may extend directly from a wall of the belt. The wall of the belt may include reinforcement to counteract undesired belt flexing. In this embodiment a device retainer 1377''' in the form of a snap joint is included to secure a keyboard 1346 and mouse 1349.

Figure 24A:
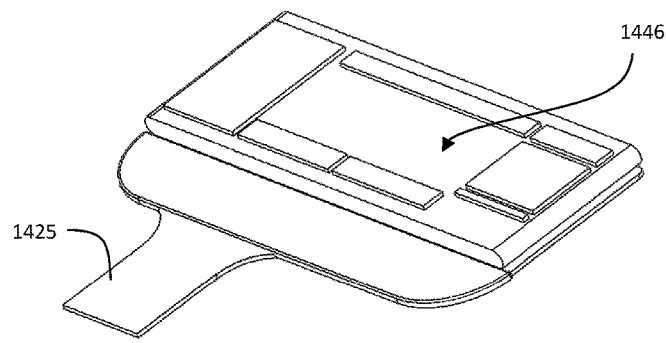
FIG. 24A is a top perspective view of the cantilevered portion of one form of an electronic device support system.
Figure 24B:
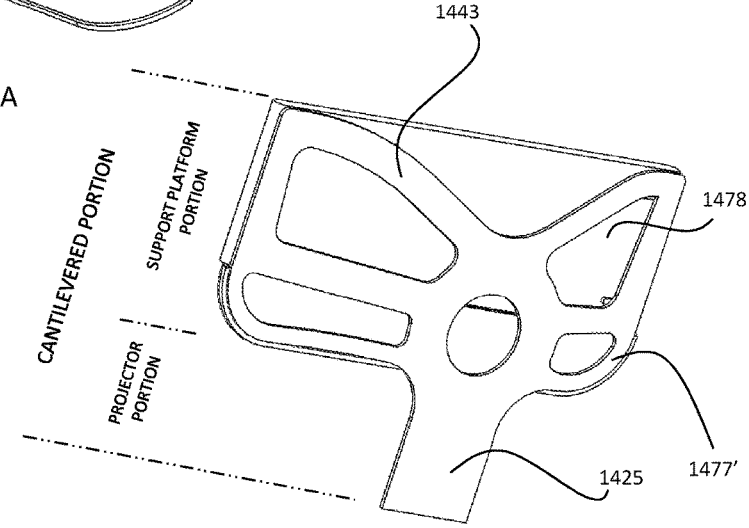
FIG. 24B is a bottom perspective view of the cantilevered portion of the electronic device support system illustrated in FIG. 24A.
Figure 24C:
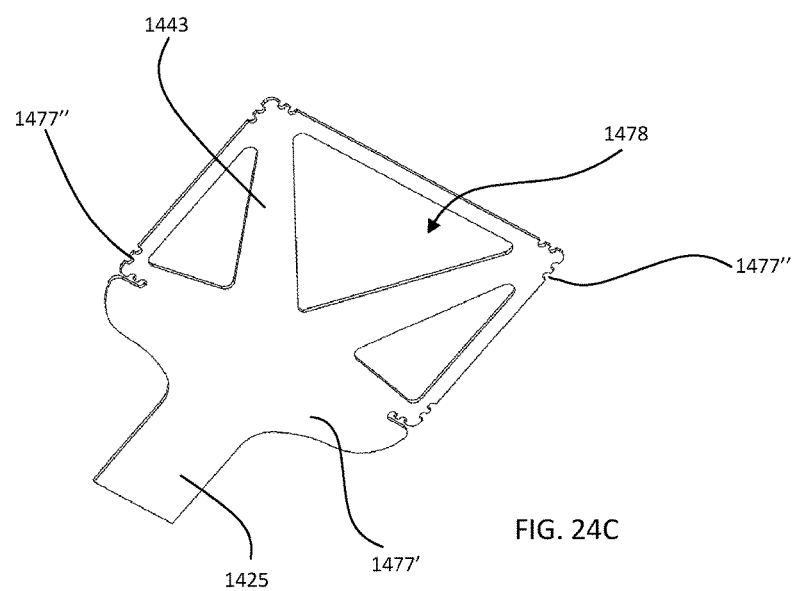
FIG. 24C is a bottom perspective view of the cantilevered portion of another form of an electronic device support system.

FIG. 24A-24C illustrate additional forms of projectors 1425 capable of instantaneous coupling and uncoupling from a base 1426 (not shown). In this embodiment, the projector 1425 is substantially flat and manufactured from a sheet metal, polymer, or composite of sufficient thickness to minimize deflection at the projector. Since bending forces within the projector are greatest nearer the base, the profile of the projector may be thickened in this area or reinforcements such as ribs may be utilized to counteract deflection (not shown). The projector 1425 transitions to a support platform 1443 portion shaped to support an electronic device such as a computer keyboard 1446 with integrated mouse or tablet. The support platform 1443 may include an extended wrist portion 1477' to serve as a wrist rest. A wrist pad may be positioned over the extended wrist portion to cushion between the extended wrist portion and the user's wrist. One or more apertures 1478 may be integrated into the support platform 1443 preferably in areas of low stress to lower weight. Fixation couplers 1477" may be used to secure the electronic device to the support platform using any of the fixation techniques introduced previously including adhesives or Velcro. An alternative fixation coupler 1477" is illustrated in FIG. 24C in the form of band channels. An elastic band is stretched diagonally across two channels in one corner of the support platform 1443 with the band laying over a portion of the electronic device to restrain it to the support platform at each corner. The base to receive the projector 1425 of this embodiment is shaped to house the flatter proximal end of projector 1425.

As illustrated earlier in FIGS. 20D and 20E the projector and or support platform may be housed within the body of the electronic device. In alternative embodiments the body of the electronic device may be formed as a continuous unitary unit with the projector.

The electronic device support system disclosed herein is designed to be quickly removed and conveniently stored utilizing minimal desk, floor, wall, or other space when not in use. FIGS. 25A through 25D illustrate two examples of support system stands configured for storing the device. It is preferred that the stand orientate parts of the electronic device support system in planes or axes that minimize storage space. For example, orientating a keyboard and mouse for storage in a generally vertical plane (i.e. plane Z, FIG. 25C) on top of a desktop will minimize desktop space utilized for the task. The stand illustrated in FIGS. 25A and 25B comprises one or more surface anchors 1591 comprising a foot portion 1591' sufficient in diameter and mass to counter balance the projector 1525 and any other components such as electronic devices and a device coupler that may be attached to it. A storage receiver 1591" is disposed on or adjacent the surface anchor 1591 for holding a projector. In this embodiment, the storage receiver 1591" is in the form of a recess sized to house the cylindrical end of a projector however the storage receiver 1591" may be configured to house other shapes and sizes. The support system stand 1593 may comprise as receiver spacer 1591''' spanning between each storage receiver 1591" to add stability to the stand and to keep each receiver correctly spaced for eased coupling with the projectors 1525.

Figure 25A:
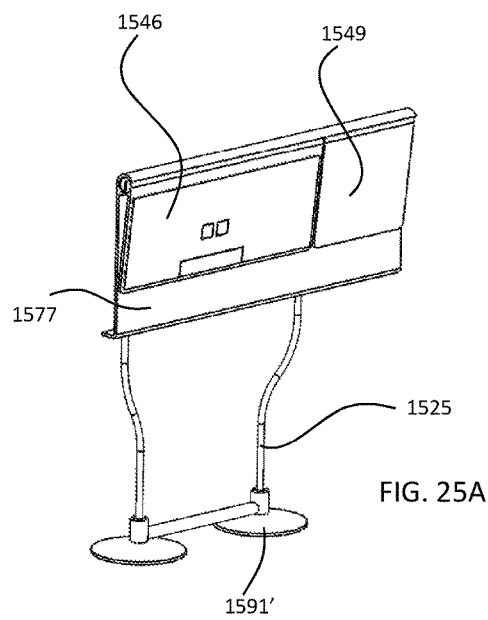
FIG. 25A is a front perspective view of one form of an electronic device support system stored in a desktop stand.
Figure 25B:
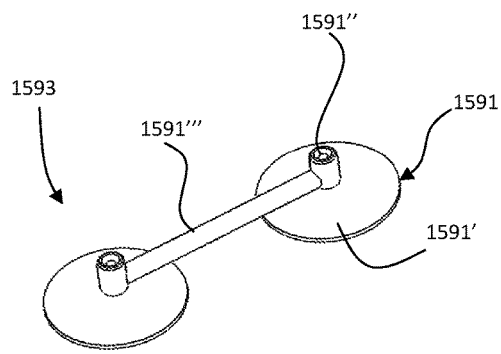
FIG. 25B is a top perspective view of one form of a desktop stand for storage of a electronic device support system.
Figure 25C:
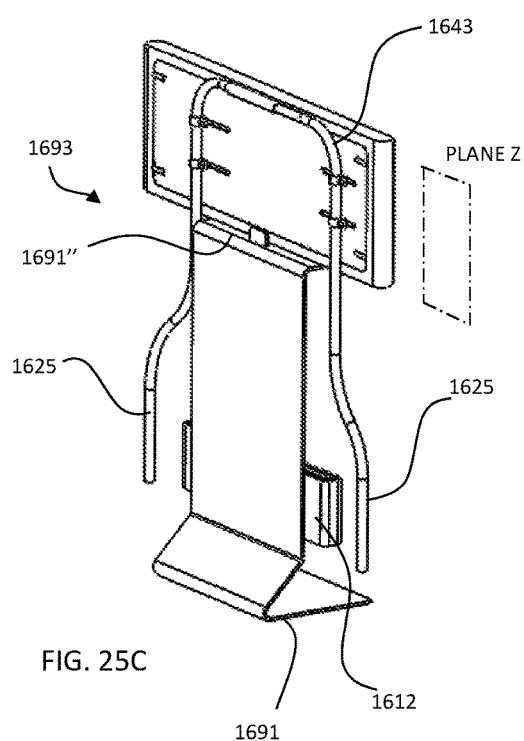
FIG. 25C is a rear perspective view of another form of a desktop stand for storage of an electronic device support system.
Figure 25D:
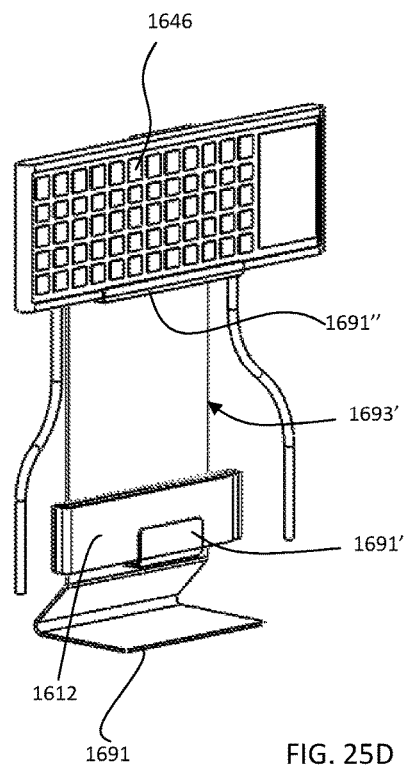
FIG. 25D is a front perspective view the desktop stand illustrated in FIG. 25C.

The stand illustrated in FIGS. 25C and 25D comprises a surface anchor 1691 here in the form of a sheet metal base of sufficient broadness to counter balance components attached to the stand 1693 to keep it upright. The stand comprises a device corral 1691" which may be in the form of a shelf or a hook or functionally similar component for supporting the electronic device and attached components such as projectors 1625 and support platform 1643. The stand may also comprise a waist mount corral 1691' illustrated in this embodiment in the form of a shelf to hold a folded belt 1691'. In alternative embodiments, the surface anchor 1691 may be removed and stand 1693 is affixed to a wall using screws, hooks, or other means. The wall mount provides user storage of the electronic device support system without occupying any of space on the user's desktop.

The electronic device support system disclosed herein provides users the option of inputting and controlling their computer while sitting, standing or freely moving about a room. In situations where the user's computer monitor remains on their desktop, the user may find it beneficial to adjust the monitor for improved viewing. Modern monitors typically are limited to approximately 5 inches of vertical adjustment however changing between sit and standing positions will cause an average vertical change in eye level of 15.6 inches. Many modern monitors also offer a screen tilt function which the user may find helpful. Another solution is to offer various forms of monitor boosters. It is preferred that the monitor booster is quickly and easily adjustable by the user to various heights sufficient to meet the eye level changes when moving between sitting and standing positions. It is also preferred that the booster compensates for the weight of the monitor wherein movement from one vertical monitor position to the other requires minimal effort by the user rather lifting or lowering the entire weight of the monitor.

Also disclosed herein are various forms of monitor boosters. In a preferred embodiment, the monitor booster is in the form of a booster platform (not shown). The booster platform comprises a generally horizontal monitor shelf sized for holding the user's monitor base. Below the monitor shelf is a booster base to rest on the typical desktop, work surface, or computer stand. Traveling between the booster base and the monitor shelf is one or more booster elevators. The booster elevator may be in the form of a linkage or rail serving to guide, support, and secure the monitor shelf to various vertical heights. The booster elevator may comprise counter balancing mechanisms such as a gas shock or counter weights or springs to provide easy vertical adjustment of the monitor shelf by the user. A locking mechanism may be utilized to release and relock the monitor shelf at a desired height. It is preferred that the monitor booster maintain a footprint not much larger than the monitor's base.

In an alternative embodiment, the monitor booster has a wall mount configuration (not shown). Here the booster elevator is in the form of a guide rail mounted to the user's wall. Extending between the guide rail and the monitor is a monitor brace configured to be secured to non-viewing portions of the monitor. Again the booster elevator may comprise a counter balancing mechanism such as a gas shock or counter weights or springs to provide easy vertical adjustment of the monitor brace with monitor by the user. A locking mechanism is again utilized to release and relock the monitor brace at a desired height. The locking mechanism is preferred to be accessible just below the monitor screen therein making it easy to grasp in both high and low monitor positions.

In yet another alternative embodiment, the user's current monitor base is replaced with a base with much greater travel. The vertical travel arm of the monitor base is extended to provide adjustment greater than 10 inches and preferably no less than about 15.6 inches.

A kit for sale to a customer may include various components disclosed in this application. A kit preferably includes any combination of one or more of the following from the group of; an electronic device support system, a monitor boost, a computer keyboard compatible with the support system, and a computer mouse also compatible with the support system. The kit may optionally include a specialized keyboard with integrated mouse.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A method of controlling input to a computer comprising the steps of:
    establishing a computer user;
    choosing a waist mount portion comprising a belt of a wearable electronic device support system sized to encircle the computer user and wherein the belt comprises an upper wall and a lower wall and an outer wall, and wherein at least one anterior receiver is coupled to the outer wall between bounds defined by the upper and lower wall of the belt;
    securing the waist mount portion to the waist of the computer user;
    securing a computer input device to a cantilevered portion of a wearable electronic device support system;
    coupling a proximal portion of the cantilevered portion to the waist mount portion wherein said computer input device is positioned on said cantilevered portion such that said computer input device is generally waist level height and a user's forearm distance from a user's body;
    and providing input to said computer input device supported by said cantilevered portion.

2. The method of controlling input to a computer of claim 1 wherein the step of securing a computer input device to a cantilevered portion of a wearable electronic device support system further comprises said computer input device being one or more of a computer keyboard and a computer cursor control.

3. The method of controlling input to a computer of claim 1 wherein the step of coupling a proximal portion of the cantilevered portion to the waist mount portion wherein said computer input device is positioned on said cantilevered portion such that said computer input device is generally waist level height and a user's forearm distance from a user's body further comprises the step of seating a projector portion of said cantilevered portion in an anterior receiver portion coupled to said waist mount portion.

4. The method of controlling input to a computer of claim 1 wherein the step of coupling a proximal portion of the cantilevered portion to the waist mount portion wherein said computer input device is positioned on said cantilevered portion such that said computer input device is generally waist level height and a user's forearm distance from a user's body further comprises the step of entirely supporting said cantilevered portion from said waist mount portion.

5. The method of controlling input to a computer of claim 1 wherein the step of coupling a proximal portion of the cantilevered portion to the waist mount portion wherein said computer input device is positioned on said cantilevered portion such that said computer input device is generally waist level height and a user's forearm distance from a user's body further comprises the step of coupling a terminal end of said projector portion with said base portion.

6. The method of controlling input to a computer of claim 1 further comprising the step of removing a proximal end of the cantilevered portion of said wearable electronic device support from a corresponding storage receiver of a desktop stand then recoupling said proximal end of the cantilevered portion to an anterior receiver coupled to said waist mount portion.

7. The method of controlling input to a computer of claim 1 further comprising the step of removing a proximal end of the cantilevered portion of said wearable electronic device support from an anterior receiver coupled to said waist mount portion and positioning the cantilevered portion upright on a desktop stand wherein said cantilevered portion is supported by one or more of: a shelf, a hook, and a storage receiver of the desktop stand.

8. The method of controlling input to a computer of claim 1 wherein said waist mount portion is in the form of a flexible belt that is folded and secured on a shelf of a waist mount corral.

9. The method of controlling input to a computer of claim 1 further comprising the step of integrating a projector portion of a wearable electronic device into a computer keyboard wherein a portion of said projector portion extends from a front edge of the keyboard.

10. The method of controlling input to a computer of claim 1 further comprising the step of adjusting the distance between spaced projectors of a cantilevered portion of a wearable electronic device support system for best user fit by one or more of: adjusting a linear slide joint coupling each projector, and by rotation of a turnbuckle coupling each projector.

11. A method of controlling input to a computer comprising the steps of:
    establishing a computer user;
    sizing a waist mount of a wearable electronic device support system to fit the computer user;
    securing the waist mount portion having a base portion located between an upper wall and a lower wall of a belt portion of said waist mount portion around the waist of the computer user;
    securing a computer input device to a cantilevered portion of the wearable electronic device support system;
    coupling a proximal portion of the cantilevered portion to the waist mount portion wherein said computer input device is positioned on said cantilevered portion such that said computer input device is generally waist level height and a user's forearm distance from a user's body;

and providing input to the computer input device supported by said cantilevered portion.

12. The method of controlling input to a computer of claim 11 wherein the step of securing a computer input device to a cantilevered portion of a wearable electronic device support system further comprises said computer input device being one or more of a computer keyboard and a computer cursor control.

13. The method of controlling input to a computer of claim 11 wherein the step of coupling a proximal portion of the cantilevered portion to the waist mount portion wherein said computer input device is positioned on said cantilevered portion such that said computer input device is generally waist level height and a user's forearm distance from a user's body further comprises the step of seating a projector portion of said cantilevered portion in an anterior receiver portion coupled to said waist mount portion.

14. The method of controlling input to a computer of claim 11 wherein the step of coupling a proximal portion of the cantilevered portion to the waist mount portion wherein said computer input device is positioned on said cantilevered portion such that said computer input device is generally waist level height and a user's forearm distance from a user's body further comprises the step of entirely supporting said cantilevered portion from said waist mount portion.

15. The method of controlling input to a computer of claim 11 wherein the step of coupling a proximal portion of the cantilevered portion to the waist mount portion wherein said computer input device is positioned on said cantilevered portion such that said computer input device is generally waist level height and a user's forearm distance from a user's body further comprises the step of coupling a terminal end of said projector portion with said base portion.

16. The method of controlling input to a computer of claim 11 further comprising the step of removing a proximal end of the cantilevered portion of said wearable electronic device support from a corresponding storage receiver of a desktop stand then recoupling said proximal end of the cantilevered portion to an anterior receiver on a base of said waist mount portion.

17. The method of controlling input to a computer of claim 1 further comprising the step of removing a proximal end of the cantilevered portion of said wearable electronic device support from an anterior receiver coupled to said waist mount portion and positioning the cantilevered portion upright on a desktop stand wherein said cantilevered portion is supported by one or more of: a shelf, a hook, and a storage receiver of the desktop stand.

18. The method of controlling input to a computer of claim 11 wherein said waist mount portion is in the form of a flexible belt that is folded and secured on a shelf of a waist mount corral.

19. The method of controlling input to a computer of claim 11 further comprising the step of integrating a projector portion of a wearable electronic device into a computer keyboard wherein a portion of said projector portion extends from a front edge of the keyboard.

20. The method of controlling input to a computer of claim 11 further comprising the step of adjusting the distance between spaced projectors of a cantilevered portion of a wearable electronic device support system for best user fit by one or more of: adjusting a linear slide joint coupling each projector, and by rotation of a turnbuckle coupling each projector.

* * * * *